US012675597B2

(12) United States Patent
Gehrmann

(10) Patent No.: US 12,675,597 B2
(45) Date of Patent: Jul. 7, 2026

(54) KEY UPDATE USING COMPARISON OF TRANSFORMED FEATURE SETS FOR EXTENDED REALITY PRIVACY

(71) Applicant: Adeia Guides Inc., San Jose, CA (US)

(72) Inventor: Christian Gehrmann, Lund (SE)

(73) Assignee: Adeia Guides Inc., San Jose, CA (US)

(*) Notice: Subject to any disclaimer, the term of this patent is extended or adjusted under 35 U.S.C. 154(b) by 118 days.

(21) Appl. No.: 18/120,130

(22) Filed: Mar. 10, 2023

(65) Prior Publication Data

US 2024/0303369 A1     Sep. 12, 2024

(51) Int. Cl.
*G06F 21/62* (2013.01)
*G06V 10/42* (2022.01)

(52) U.S. Cl.
CPC .......... *G06F 21/6245* (2013.01); *G06V 10/42* (2022.01)

(58) Field of Classification Search
CPC .............................. G06F 21/6245; G06V 10/42
See application file for complete search history.

(56) References Cited

U.S. PATENT DOCUMENTS

| | | |
|---|---|---|
| 10,719,993 B1 | 7/2020 | Ha |
| 11,082,731 B1 | 8/2021 | Cox et al. |
| 11,106,328 B1 | 8/2021 | Holland et al. |
| 11,139,958 B2 | 10/2021 | Smith et al. |
| 11,804,068 B2 | 10/2023 | Li |
| 12,499,268 B2 | 12/2025 | Gehrmann |
| 2001/0002212 A1 | 5/2001 | Asano et al. |
| 2009/0007257 A1 | 1/2009 | Hirata et al. |
| 2009/0070860 A1 | 3/2009 | Hirata et al. |
| 2011/0150327 A1 | 6/2011 | Yoo et al. |
| 2013/0004090 A1* | 1/2013 | Kundu ................... G06V 20/52 |
| | | 382/284 |
| 2015/0310671 A1 | 10/2015 | Kim et al. |
| 2017/0337352 A1 | 11/2017 | Williams |
| 2018/0053284 A1 | 2/2018 | Rodriguez et al. |
| 2018/0180882 A1 | 6/2018 | Tuli |
| 2019/0180509 A1 | 6/2019 | Laaksonen et al. |

(Continued)

OTHER PUBLICATIONS

U.S. Appl. No. 18/120,128, filed Mar. 10, 2023, Christian Gehrmann.

(Continued)

*Primary Examiner* — Catherine Thiaw
*Assistant Examiner* — Daniel Elahian
(74) *Attorney, Agent, or Firm* — HG LAW LLP

(57) ABSTRACT

Systems and methods are provided herein for providing privacy while allowing interactions with virtual representations of sensitive objects. This may be accomplished by an extended reality (XR) system receiving information associated with a real-world environment of a user. The XR system may transmit the received information to one or more devices (e.g., server, XR device, etc.) for processing. Before transmitting the received information, the XR system can use the received information to identify and categorize objects in the real-world environment to identify sensitive objects. To protect the privacy of the sensitive objects, the XR system transforms features of the sensitive objects using (Continued)

one or more transform keys prior to transmitting the information to the one or more devices. The XR system may also update the transform keys after a first time period to further protect the privacy of the sensitive objects.

19 Claims, 19 Drawing Sheets

(56)                References Cited

U.S. PATENT DOCUMENTS

| | | | |
|---|---|---|---|
| 2019/0197599 A1 | 6/2019 | Zia et al. | |
| 2019/0378204 A1 | 12/2019 | Ayush et al. | |
| 2020/0051328 A1 | 2/2020 | Mohan et al. | |
| 2020/0241647 A1 | 7/2020 | Kanda | |
| 2020/0242360 A1 | 7/2020 | Alexander | |
| 2020/0265613 A1 | 8/2020 | Yoon et al. | |
| 2021/0116990 A1* | 4/2021 | Song | A63F 13/211 |
| 2021/0383018 A1* | 12/2021 | Keskikangas | G06F 21/6209 |
| 2021/0390884 A1 | 12/2021 | Bush et al. | |
| 2022/0083676 A1* | 3/2022 | San Pedro | G06V 20/52 |
| 2022/0159176 A1* | 5/2022 | Vemury | G06T 7/70 |
| 2022/0165034 A1 | 5/2022 | Zhou et al. | |
| 2022/0188833 A1 | 6/2022 | May et al. | |
| 2022/0255995 A1 | 8/2022 | Berliner et al. | |
| 2022/0261579 A1 | 8/2022 | Jindal et al. | |
| 2022/0269816 A1 | 8/2022 | Qian et al. | |
| 2023/0052663 A1* | 2/2023 | Sheppard | H04L 9/0861 |
| 2023/0119556 A1 | 4/2023 | Uprit | |
| 2023/0130535 A1* | 4/2023 | Ma | G06T 13/40 |
| | | | 345/474 |
| 2023/0237192 A1 | 7/2023 | Kahan et al. | |
| 2023/0306600 A1 | 9/2023 | Zhang et al. | |
| 2024/0004969 A1 | 1/2024 | Gai et al. | |
| 2024/0064266 A1 | 2/2024 | Hosangadi et al. | |
| 2024/0303370 A1 | 9/2024 | Gehrmann | |
| 2024/0303946 A1 | 9/2024 | Gehrmann | |
| 2025/0191321 A1* | 6/2025 | Shen | G06T 19/20 |

OTHER PUBLICATIONS

U.S. Appl. No. 18/120,131, filed Mar. 10, 2023, Christian Gehrmann.
Alam, M.S. , et al., "A Comparative Analysis of Feature Extraction Algorithms for Augmented Reality Applications", 2021 IEEE 7th International Conference on Smart Instrumentation, Measurement and Applications (ICSIMA), 59-63, 2021.
De Guzman, Jaybie A., et al., "Security and Privacy Approaches in Mixed Reality: A Literature Survey", ACM Comput. Surv. 52, 6, Article 110, 37 pages, 2019.
Jain, Anil K., et al., "Biometric Template Security", EURASIP Journal on Advances in Signal Processing, 2008.
Mirza, Tabasum , et al., "Virtual Reality, Augmented Reality, and Mixed Reality Applications: Present Scenario", 2022 2nd International Conference on Advance Computing and Innovative Technologies in Engineering (ICACITE), 1405-1412, 2022.
Nagar, Abhishek , et al., "Biometric Template Transformation: A Security Analysis", Proceedings vol. 7541, media Forensics and Security II, 2010.
Natgunanathan, Iynkaran , et al., "Protection of Privacy in Biometric Data", IEEE Access, vol. 4, 880-892, 2016.
Parmar, Jekishan K., et al., "Feature Extraction in Augmented Reality", arXiv, retrieved at https://arxiv.org/pdf/1911.09177.pdf, 2019.
Savvides, Marios , et al., "Cancelable Biometric Filters for Face Recognition", Proceedings of the 17th International Conference on Pattern Recognition, ICPR, vol. 3, 2004.
Wang, Song , et al., "Design of alignment-free cancelable fingerprint templates via curtailed circular convolution", Pattern Recognition, vol. 47, No. 3, 1321-1329, 2014.
U.S. Appl. No. 17/712,325, filed Apr. 4, 2022.
U.S. Appl. No. 17/987,013, filed Nov. 15, 2022.

* cited by examiner

<u>100</u>

100

402

| Object ID 404 | Protection Class 406 | Key Identifier 408 | Transformed Features 410 | Encrypted Object 412 | Metadata 414 |
|---|---|---|---|---|---|

| Object ID 404 | Protection Class 406 | Key Identifier 408 | Encrypted Object 412 | Image Processing Instructions 418 | Metadata 414 |
|---|---|---|---|---|---|

| SERVER | SERVER | USER DEVICE |

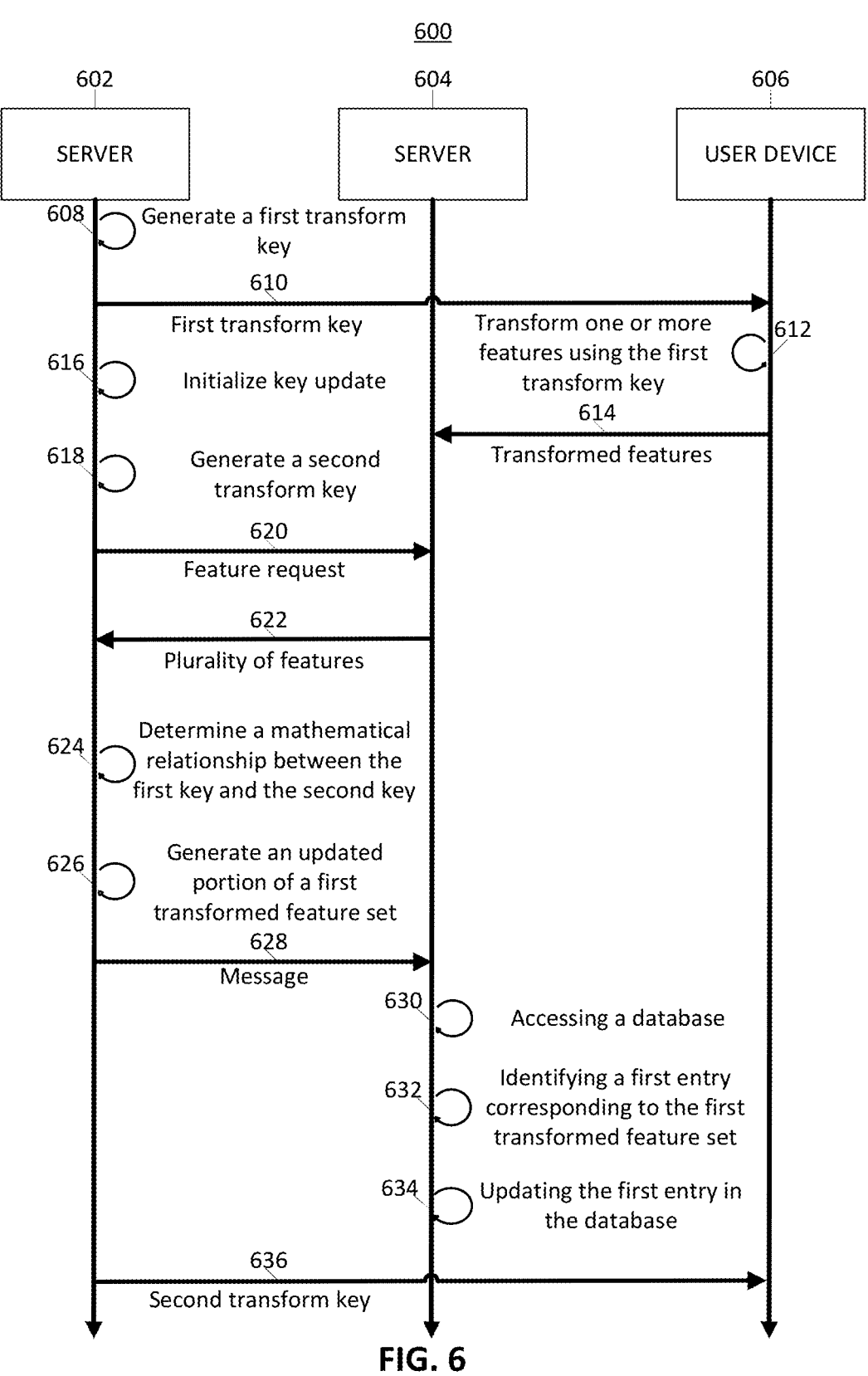

608  Generate a first transform key

610
First transform key

Transform one or more features using the first transform key  612

616  Initialize key update

614
Transformed features

618  Generate a second transform key

620
Feature request

622
Plurality of features

624  Determine a mathematical relationship between the first key and the second key 626  Generate an updated portion of a first transformed feature set 628
Message 630  Accessing a database 632  Identifying a first entry corresponding to the first transformed feature set 634  Updating the first entry in the database 636
Second transform key

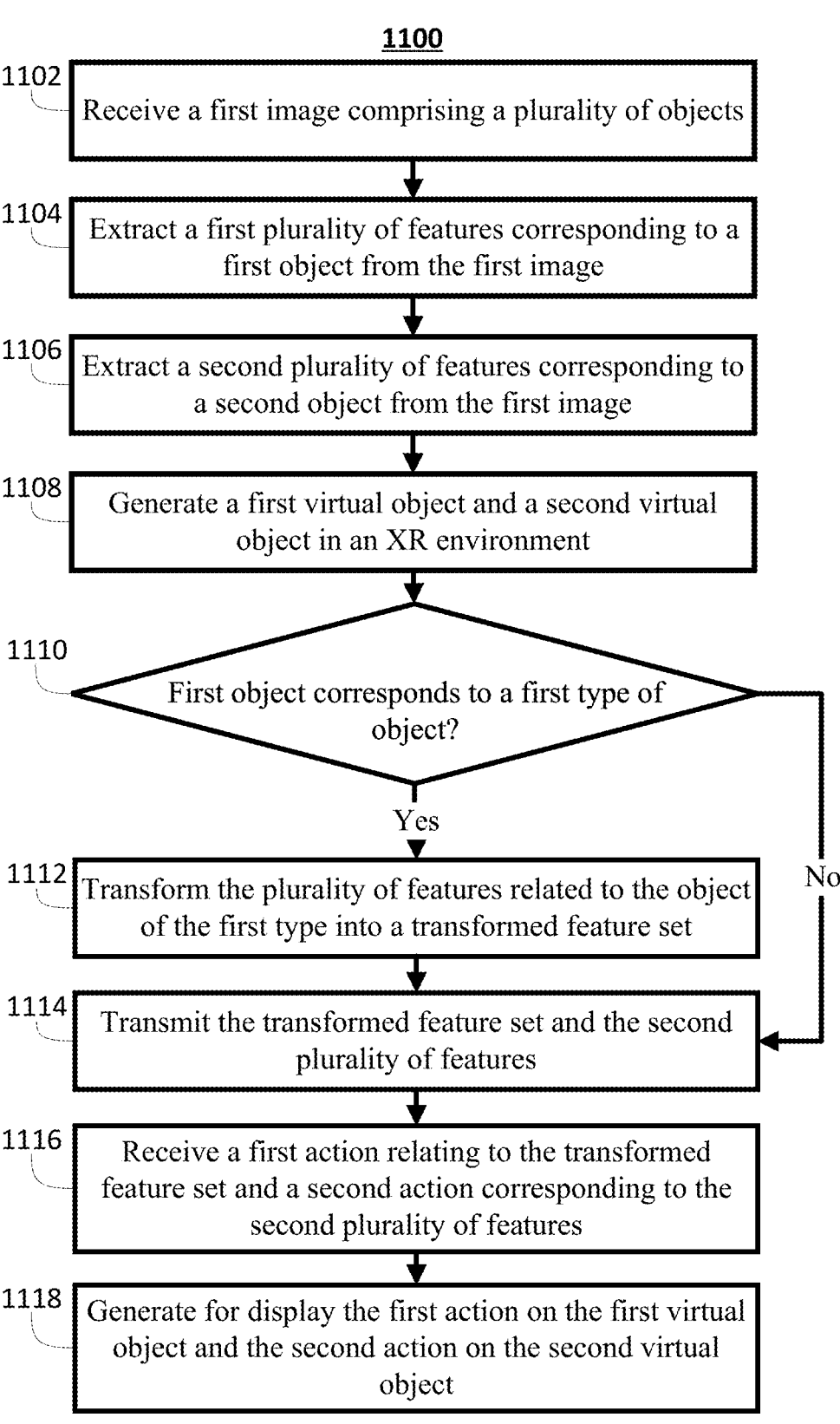

1100

1102 — Receive a first image comprising a plurality of objects

1104 — Extract a first plurality of features corresponding to a first object from the first image 1106 — Extract a second plurality of features corresponding to a second object from the first image 1108 — Generate a first virtual object and a second virtual object in an XR environment 1110 — First object corresponds to a first type of object?

Yes

No

1112 — Transform the plurality of features related to the object of the first type into a transformed feature set 1114 — Transmit the transformed feature set and the second plurality of features 1116 — Receive a first action relating to the transformed feature set and a second action corresponding to the second plurality of features 1118 — Generate for display the first action on the first virtual object and the second action on the second virtual object

FIG. 11

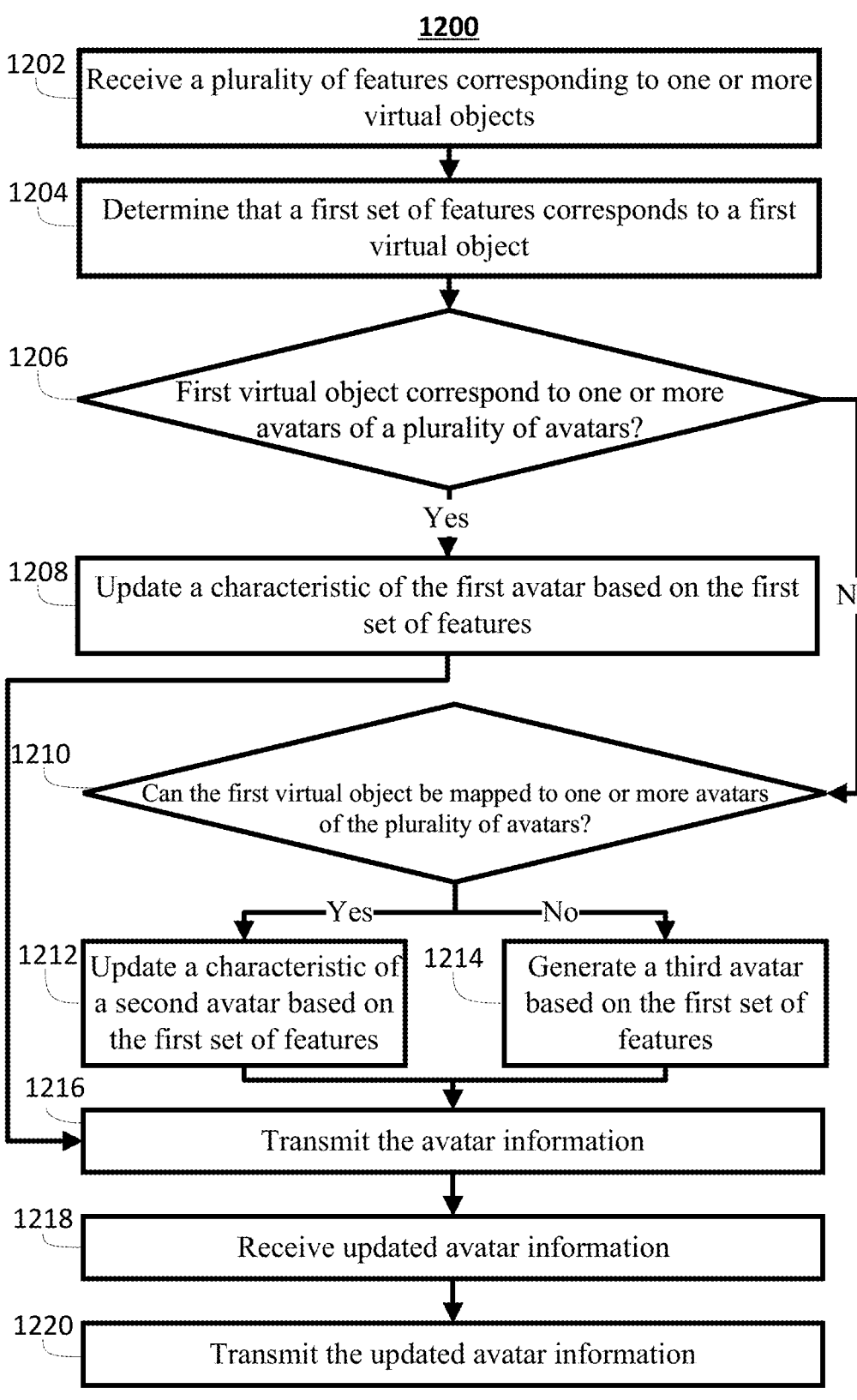

1200

1202 — Receive a plurality of features corresponding to one or more virtual objects 1204 — Determine that a first set of features corresponds to a first virtual object 1206 — First virtual object correspond to one or more avatars of a plurality of avatars?

Yes

No

1208 — Update a characteristic of the first avatar based on the first set of features 1210 — Can the first virtual object be mapped to one or more avatars of the plurality of avatars?

Yes — No

1212 — Update a characteristic of a second avatar based on the first set of features 1214 — Generate a third avatar based on the first set of features 1216 — Transmit the avatar information 1218 — Receive updated avatar information 1220 — Transmit the updated avatar information

KEY UPDATE USING COMPARISON OF TRANSFORMED FEATURE SETS FOR EXTENDED REALITY PRIVACY

BACKGROUND

The present disclosure relates to extended reality (XR) technologies, and in particular to techniques for preserving the privacy of a user in connection with an XR application.

SUMMARY

Advancements in media technology have led to development of XR technologies, such as virtual reality (VR), augmented reality (AR) and mixed reality (MR) technologies. VR systems may fully immerse (e.g., giving the user a sense of being in an environment) or partially immerse (e.g., giving the user the sense of looking at an environment) users in a three-dimensional (3D), computer-generated environment. AR systems may provide a modified version of reality, such as enhanced information overlaid over real-world objects. MR systems map interactive virtual objects to the real world. Such systems may utilize wearables, such as a head-mounted device, comprising a stereoscopic display, or smart glasses.

While XR technologies provide many benefits, some XR applications collect a large amount of user data that the user may not wish to be collected. For example, many XR applications require data from sensors (e.g., camera, microphones, depth sensors, etc.) of an XR device to perform its functions (e.g., particularly in AR contexts). The collected data may include information related to sensitive objects in the vicinity of the XR device. For example, the collected data may include information related to the environment of a home, environment of a business, people's faces, bank statements, credit cards, checkbooks, identity documents, etc. The collected information may be not only be stored locally at a client providing XR functionality to an end-user; it may also be transmitted to a server facilitating the XR experience. At that point, the collected information may be stored and analyzed to determine interests of the user, to target the user with ads based on those interests, etc. Moreover, a security breach may result in bad actors accessing the user's sensitive information. Accordingly, there exists a need to prevent XR applications from having access to data containing information relating to sensitive objects in the vicinity of the XR devices.

In some instances, this problem may be combated by identifying sensitive objects and redacting collected information associated with the sensitive object at the server. For example, if the collected information comprises a picture of a checkbook, the server may blur the picture of the checkbook. While this may prevent other clients from seeing the sensitive objects, it does not address the problem with the XR server having access to sensitive information. In some instances, an XR client may blur sensitive objects, preventing the server from receiving sensitive object information. While this may prevent information associated with the sensitive object from being collected by the XR applications at the server, but these methods do not allow the server to process the sensitive object, degrading the XR experience for the user (e.g., for a multi-user application, other users will not be able to see or interact with the object).

In an example, a first XR device may use one or more sensors (e.g., camera) to capture information associated with the first user's real-world environment to generate a first XR environment that corresponds to a virtual representation of the first user's real-world environment. This information may comprise images of real-world objects (e.g., furniture, pictures, people, etc.). The first XR device may transmit the information to a second XR device corresponding to a second user, so the second XR device can generate a second XR environment that simulates the first XR environment. This way the first user and the second user experience being in the same XR environment. However, in this shared XR environment, the first user may want to avoid other users (e.g., second user) seeing: (i) sensitive physical objects in his or her environment (e.g., a real-world family portrait in the first user's office); (ii) virtual representations that look like the sensitive objects or that convey the same or similar information as the sensitive objects (e.g., an image or video of the real-world family portrait, a virtual object modeled to look like the real-world family portrait, etc.); or (iii) sensitive virtual objects having no real-world counterpart (e.g., a family portrait in a XR environment that does not correspond to a real-world family portrait). Further, the first user may want to avoid servers receiving or accessing such sensitive information. Regardless of whether a sensitive object exists in the real-world or has a real-world counterpart, a user may wish to avoid transmitting data (e.g., image or video data, XR data, etc.) that would enable others to view or analyze depictions or features of the sensitive object. In traditional methodologies, in response to the first user indicating that an object (e.g., family picture) is sensitive, the first XR device alters captured information related to the sensitive object before transmitting the information to the second XR device. In some embodiments, this may result in the portion of the second XR environment corresponding to the sensitive object being blurred. However, this method degrades the XR experience for the first user and a second user because the second user is unable to interact with the sensitive object. For example, the blurred virtual object may lack defined dimensions so the second XR device may be unable to make collision detection calculations. In such an example, the second user may be unable to interact (e.g., change the position, change the orientation, change the size, change the shape, etc.) with the blurred virtual object whatsoever. In some embodiments, even if interactions between the second user and the blurred object were possible, the first XR device may be unable to map the interactions of the second user and the blurred virtual object with sufficient precision due to the differences between the captured information used to generate the sensitive object in the first XR environment and the altered information used to generate the blurred sensitive object in the second XR environment.

Accordingly, techniques are disclosed herein to enable an XR device (e.g., a client device) to avoid transmitting (e.g., to a server) data representing a sensitive object (e.g., image data or model data) in a user's environment that might otherwise be captured or transmitted to servers or other user devices, while also allowing other users to interact with virtual representations of the sensitive objects. Rather than transmitting the data representing the sensitive object, the XR device may transmit substituted information (e.g., a transformed set of features of the sensitive object), which the server may map to a "stand-in" virtual object that is provided in place of the sensitive object. Subsequently, users (e.g., including the user of the XR device, if desired) may receive, from the server, data for rendering virtual objects captured by the XR device. This received data may include the "stand-in" virtual object in place of the original sensitive object. Users may interact with the "stand-in" virtual object, if desired (e.g., to change graphical qualities of the virtual object, to move or manipulate the virtual object, etc.). In one example, an XR device (e.g., a client device for an end-user) may capture data (e.g., images, audio, etc.) related to a user's environment using one or more sensors. The data may comprise information related to one or more objects in the vicinity of the user. For example, a first object may be a checkbook and a second object may be a chair. The XR device may then extract a plurality of features from the data. One or more techniques (e.g., feature matching) may be used to determine that a first set of features of the plurality of features relates to the first object and a second set of features of the plurality of features relates to the second object. The XR device may then determine (e.g., via a classification algorithm) a type associated with the one or more objects in the vicinity of the user using the plurality of features. For example, the classification algorithm may classify the checkbook as a first type (corresponding to a private object) and the chair as a second type (corresponding to a public object). The XR device may display the first object as a first virtual object and the second object as a second virtual object in a first XR environment using the first set of features and the second set of features. The XR device may than transform features of objects of a certain type (e.g., first type corresponding to private objects) using a feature transform key corresponding to the object type. For example, the first set of features corresponding to the first object (the checkbook) may be transformed into a transformed feature set using a first transform key.

One or more feature transforms may be associated with the first transform key. For example, the first set of features may be convolved with a random convolution kernel. In another example, the first set of features may be multiplied with a random key in the frequency plane after applying a discrete Fourier transform (DFT) to the key and the first set of features. The feature transform key may be stored in a database comprising a plurality of transform keys where each transform key of the plurality of transform keys correspond to one or more object types. The XR device may send the second set of features corresponding to the second object and the transformed feature set corresponding to the first object to a server. In some embodiments, the XR device encrypts the second set of features and/or the transformed feature set using an encryption key. Encrypting the data, or a portion of the data, may allow the XR device to send the full data set related to one or more objects (e.g., the first object, second object, etc.) to the server and vice versa. For example, the server may encrypt the full data set or portions of the data set related to one or more objects. The server may then transmit the encrypted data related to the one or more objects along with actions corresponding to the one or more objects to the XR device. Encrypting the data can also provide additional security for sensitive objects. For example, the connection between an XR device and a server may be compromised, and an unauthorized entity may gain access to the data being exchanged between the XR device and server. In such a scenario, the unauthorized entity would have to overcome both the encryption and the feature transformation to determine any characteristics related to the sensitive object.

The server may process the second set of features and the transformed feature set received from the XR device by determining whether the second set of features and/or the transformed feature set correspond to stored virtual objects. For example, the server may have a database of stored virtual objects used in a second XR environment where the transformed feature set relates to a third virtual object and the second set of features relates to a fourth virtual object.

In some embodiments, if a received set of features does not correspond to a stored virtual object the server stores a new virtual object corresponding to the received set of features. The server may generate one or more actions relating to one or more virtual objects. For example, a home decorating application on the server may change the position of the third virtual object. In another embodiment, the server may receive one or more actions relating to one or more virtual objects in the second XR environment. For example, a second user may be wearing a second XR device displaying the second XR environment. The second user may take a first action by changing the position of the third virtual object in the second XR environment and may take a second action by changing the orientation of the fourth virtual object in the second XR environment. The server may receive the first and second actions from the second XR device and send the actions to the first XR device. The server may also indicate that the first action relates to the transformed set of objects and the second action relates to the second set of features. The first XR device can process the actions to update the first virtual object and the second virtual object in the first XR environment. For example, the position of the first virtual object may change in the first XR environment according to the first action and the orientation of the second virtual object may change in the first XR environment according to the second action. The XR device may use the first transform key to translate the first action onto the first virtual object.

By transforming sensitive objects at the client device, the server no longer has access to data containing information relating to sensitive objects, however other users can interact with virtual representations of the sensitive objects. For example, the third virtual object corresponds to the first virtual object (the checkbook), but the second user and the server are unable to obtain any sensitive information from the first virtual object because the set of features related to the first virtual object are transformed by the feature transform corresponding to the first transform key. The second user is still able to interact with the third virtual object by changing the position of the third virtual object, which resulted in the position of the first virtual object changing in the first XR environment. Additionally, the described transformation mapping between the first virtual object and the third virtual object allows the system to recognize that the same object occurs again in a later point of time. Accordingly, the system does not have to generate a new virtual object in the second XR environment every time a transformed feature set is submitted to the server.

In some embodiments, the transform algorithms used to generate the transformed feature sets are associated with transform keys and each transform key is associated with a different transform that generates a different transformed feature set for the same underlying virtual object. For example, the system can generate a first transformed feature set using a first transform key on the first set of features and can generate a second transformed feature set using a second transform key on the first set of features. Using the same transform keys repetitively may result in bad actors eventually determining how a transformed feature set maps back to an original object. Accordingly, there exists a need to update or replace transform keys to increase security.

Accordingly, techniques are disclosed herein for efficiently updating or replacing transform keys in an XR system. After a "key update" or "key refresh," a first transform key may be replaced with a second transform key when transforming a given object. While the first transform key may result in a first transformed feature set for the given object, the second transform key may result in a second transformed feature set for the given object. Disclosed herein are various techniques that enable a server to know that the second transformed feature set maps to the same sensitive object as the first transformed feature set (thereby enabling the server to "replace" the sensitive object with the same virtual object despite receiving a different transformed feature set). For example, a user may identify a virtual object (e.g., family picture) that is sensitive in a first XR environment. The system may label or identify this virtual object (e.g., family picture) as a sensitive virtual object. During example operation, a first transform key and a corresponding first transform may result in a first transformed feature set being generated and transmitted to an XR server (in place of transmitting the sensitive underlying virtual object). The XR server may identify an avatar to map to the first transformed feature set and may insert the avatar when generating a version of the XR environment to other users. For example, a second XR environment may be generated for other users wherein the second XR environment is the same or similar as the first XR environment.

After a first time period and/or after a threshold number of transformed feature sets have been transmitted to the XR server, the system may replace the first transform key with a second transform key corresponding to a second transform. As a result, the system may utilize the second transform instead of the first transform when transforming the plurality of features associated with the first virtual object, resulting in a second transformed feature set different from the first transformed feature set. However, this may create problems with the XR server. For example, the XR server may no longer be able to map the second transformed feature set to the same avatar to which the first transformed feature set was mapped.

In a first example, to overcome this problem, the system may utilize both the first transform and second transform to transmit both the first transformed feature set and second transformed feature set for a key update period (e.g., while indicating to the XR server that both correspond to the same underlying virtual object). In some embodiments, the XR server updates a database comprising a plurality of entries mapping transformed feature sets to avatars. For example, a first entry may correspond to the first transformed features set associated with a first avatar, and the XR server may update the first entry to include the second transformed feature set. As a result, the XR system can update a mapping for the first avatars to indicate that the second transformed feature set maps to the first avatar (e.g., in addition to or instead of the first transformed feature set). After the key update period expires, the XR system may stop sending transformed feature sets generated using the first transform key to the XR server. For example, an XR client may stop sending transformed feature sets generated using the first transform key after receiving a message from the XR server indicating that the key update period has finished (e.g., indicating that the number of avatars solely linked to transformed feature sets associated with the first transform key is below a threshold number).

In a second example, to overcome this problem, a key update occurs instantly or near instantly. To facilitate such an update, a key server may generate a second transform key. The key server may then transmit a request to the XR server, requesting a first transformed feature set corresponding to a first avatar. In some embodiments, the key server requests a plurality of transformed features sets corresponding to a plurality of avatars. In response, the XR server may transmit to the key server a first transformed feature set linked to the first avatar. Then, the key server may determine a mathematical relationship (e.g., a delta) between the first transform key and the second transform key. The key server may also generate an updated portion of the first transformed feature set using the received first transformed feature set and the second transform key. Then, the key server may transmit a message including the determined mathematical relationship and updated portion of the first transformed feature set to the XR server. The XR server can receive the message and update the first transformed feature set for the first avatar by (i) replacing the first portion of the first transformed feature set with the updated portion of the first transformed feature set and (ii) adjusting a second portion of the first transformed feature set using the mathematical relationship, resulting in a second transformed feature set that is now mapped to the first avatar. As a result, when the XR server receives, from the client, a set of features transformed using the second transform key, the XR server uses the second transformed feature set in a look-up to determine that they are mapped to the first avatar. Consequently, the XR server can map the first avatar to a set of features transformed using the second transform key.

BRIEF DESCRIPTION OF THE DRAWINGS

The below and other objects and advantages of the disclosure will be apparent upon consideration of the following detailed description, taken in conjunction with the accompanying drawings in which:

FIGS. 4A-4B show illustrative diagrams of packet formats used to transmit information about virtual objects, in accordance with some embodiments of the disclosure;

FIG. 6 shows another illustrative flowchart of a process for updating one or more transform keys, in accordance with some embodiments of the disclosure;

FIG. 11 is another illustrative flowchart of a process for providing privacy while allowing interactions with virtual representations of sensitive objects, in accordance with some embodiments of the disclosure;

FIG. 12 is another illustrative flowchart of a process for providing privacy while allowing interactions with virtual representations of sensitive objects, in accordance with some embodiments of the disclosure.

DETAILED DESCRIPTION

Figure 1:
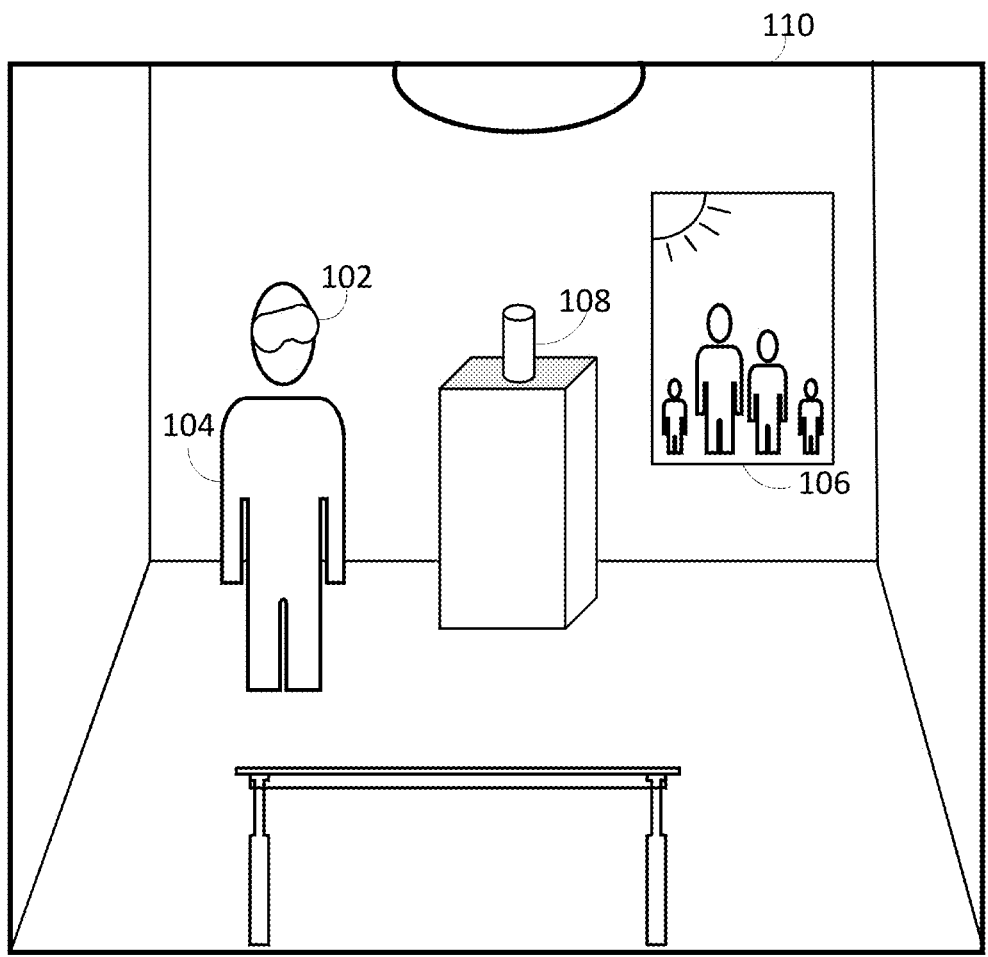
FIG. 1 shows an illustrative diagram of a system for providing privacy while allowing interactions with virtual representations of sensitive objects, in accordance with some embodiments of the disclosure.

FIG. 1 shows an illustrative diagram of a system 100 for providing privacy while allowing interactions with virtual representations of sensitive objects, in accordance with some embodiments of the disclosure. System 100 includes a user 104 wearing an XR device 102. Although the XR device 102 is shown as a headset, any device or devices that can display an XR environment may be used. In some embodiments, the XR device 102 is in communication with one or more other devices (e.g., server, router, smartphone, tablet, desktop, television, and/or similar such devices). In some embodiments, the XR device 102 communicates with one or more other devices using one or more wired and/or wireless communication protocols.

In some embodiments, the XR device 102 captures data related to the environment 110 of the user 104 using one or more sensors. For example, the XR device 102 may use one or more cameras to capture image data related to the environment 110. In some embodiments, the data comprises information related to a first object 106 and a second object 108. The XR device may then extract a plurality of features from the received data to identify one or more objects in the environment 110. In some embodiments, the XR device 102 uses one or more techniques (e.g., feature matching) to determine that a first set of features of the plurality of features relates to the first object 106 and a second set of features of the plurality of features relates to the second object 108. In some embodiments, one or more of the processing steps described in herein are performed by a device other than the XR device 102. For example, the XR device may capture the data related to the environment 110 and transmit the data to a trusted device (e.g., edge server), where the data is processed.

In some embodiments, the XR device 102 uses the plurality of features to determine a type associated with one or more of the identified objects. For example, the XR device 102 may use a classification algorithm to classify the first object 106 as a first type and the second object 108 as a second type. An object type may correspond to any attribute related to an object. For example, the object type may relate to the sensitivity of the object and a first type may correspond to private objects while a second type may correspond to non-private objects. In another example, the object type may relate to a maturity ranking of the object and a first type may correspond to objects suitable for children and a second type may correspond to objects not suitable for children. In another example, the object type may be related to the functionality of the object and a first type may correspond to objects relating to medical treatment and a second type may correspond to objects relating to furniture. In some embodiments, the XR device categorizes a plurality of objects using a plurality of object types.

In some embodiments, the first object 106 is a personal photograph comprising private information and the second object 108 is a statute without any private information. The XR device may use the first set of features to determine that the first object 106 is a first type (private object) and may use the second set of features to determine that the second object

108 is a second type (public object). In some embodiments, the XR device uses a profile associated with the user 104 when determining the object types for the first object 106 and the second object 108. For example, the user 104 may input one or more preferences (e.g., family photos correspond to private objects, banking information corresponds to private objects, furniture corresponds to public objects, etc.). In some embodiments, the XR device 102 uses the one or more preferences when determining object types for the first object 106 and the second object 108.

Figure 2A:
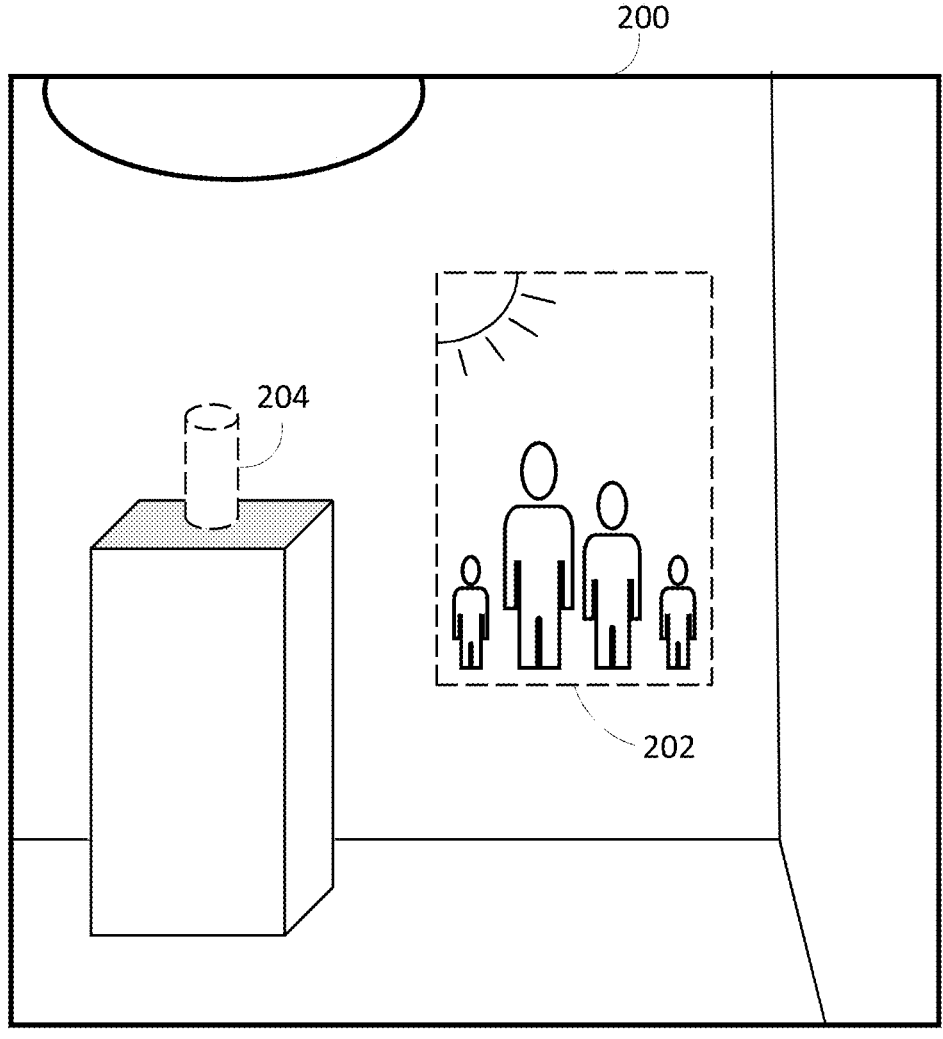
FIGS. 2A-2D show additional illustrative diagrams of a system for providing privacy while allowing interactions with virtual representations of sensitive objects, in accordance with some embodiments of the disclosure.

FIGS. 2A-2D show additional illustrative diagrams of a system for providing privacy while allowing interactions with virtual representations of sensitive objects, in accordance with some embodiments of the disclosure. In some embodiments, FIG. 2A shows a first virtual environment 200. In some embodiments, the first virtual environment 200 is displayed by an XR device (e.g., XR device 102) for a user (e.g., user 104). In some embodiments, the first virtual environment 200 corresponds to a real-world environment (e.g., environment 110).

In some embodiments, an XR device receives data related to a real-world environment. In some embodiments, the received data comprises information related to a plurality of real-world objects (e.g., first object 106, second object 108, etc.). In some embodiments, the XR device extracts a plurality of features from the received data to identify one or more real-world objects. In some embodiments, the XR device uses the received data to generate virtual objects in the first virtual environment 200 corresponding to real-world objects. For example, the XR device may display a first real-world object (e.g., first object 106) as a first virtual object 202 and a second real-world object (e.g., second object 108) as a second virtual object 204 in the first virtual environment 200.

In some embodiments, the XR device transmits data relating to the first virtual environment 200 to a device (e.g., server, second XR device, smartphone, desktop computer, etc.). For example, the XR device may transmit the data relating to the first virtual environment 200 to a server providing XR services. In some embodiments, the XR device encrypts the data relating to the first virtual environment 200 using an encryption key. In some embodiments, encrypting the data provides additional security for sensitive objects.

In some embodiments, the XR device transforms features of virtual objects corresponding to a certain type. In some embodiments, the XR device receives an input relating to a type of object. For example, the XR device may receive a user preference requesting that private information is not shared. In some embodiments, in response to the input relating to the type of object, the XR device identifies all virtual objects corresponding to the indicated type. For example, the XR device may use a classification algorithm to determine that the first virtual object 202 corresponds to a private object. In some embodiments, the XR device transforms the set of features for all virtual objects corresponding to the indicated type. For example, the XR device may transform a first set of features relating to the first virtual object 202 because the first virtual object is classified as a private object. The XR device may not transform a second set of features relating to the second virtual object 204 because the second virtual object is classified as a public object. In some embodiments, the XR device sends the transformed set of features corresponding to the first virtual object 202 and the second set of features corresponding to the second virtual object 204 to a device.

In some embodiments, the XR device transforms features of objects of a certain type (e.g., first type corresponding to private objects) using a feature transform corresponding to a transform key associated with the object type. For example, a first set of features corresponding to the first virtual object 202 may be transformed into a transformed feature set using a first feature transform corresponding to a first transform key. One or more feature transforms may be associated with the first transform key. For example, the first set of features may be convolved with a random convolution kernel. In another example, the first set of features may be multiplied with a random key in the frequency plane after applying a DFT to the key and the first set of features. The feature transform key may be stored in a database comprising a plurality of transform keys where each transform key of the plurality of transform keys correspond to one or more object types. For example, a first transform key may correspond to private objects while a second transform key may correspond to age-restricted objects.

Figure 2B:
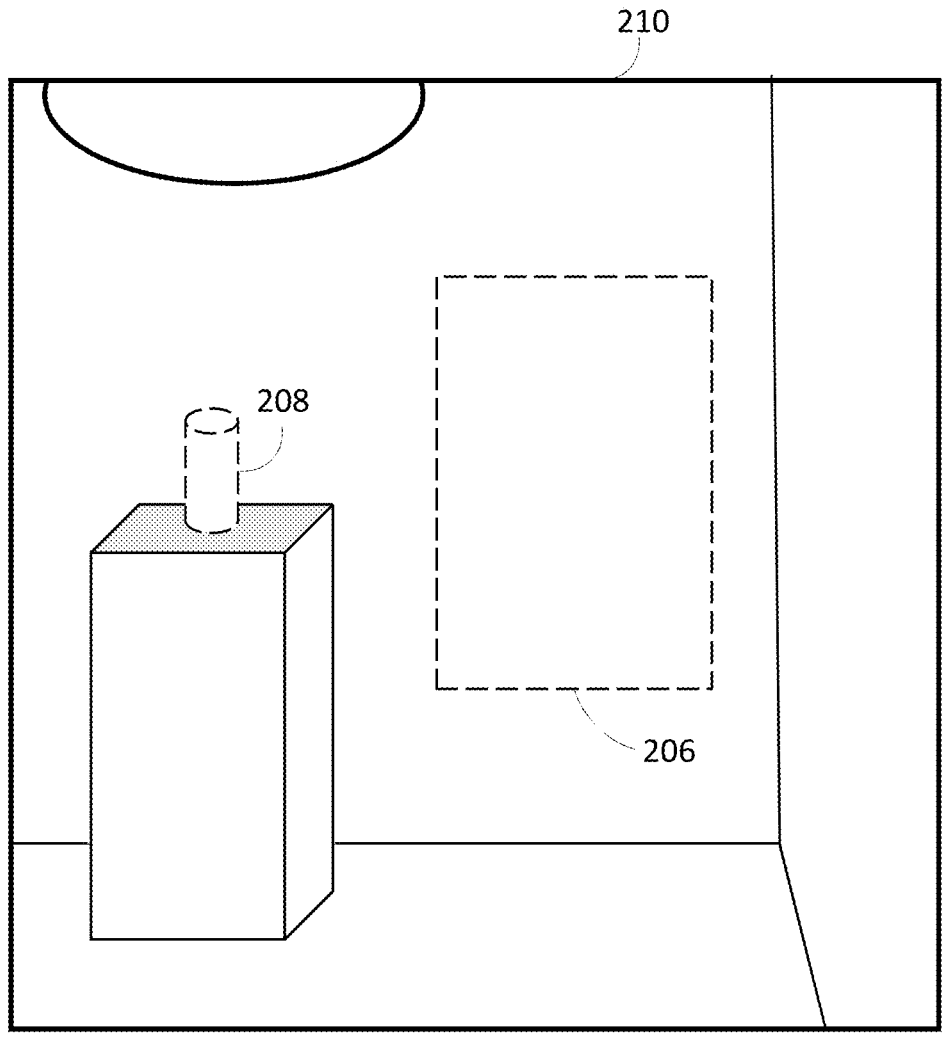
Figure 2C:
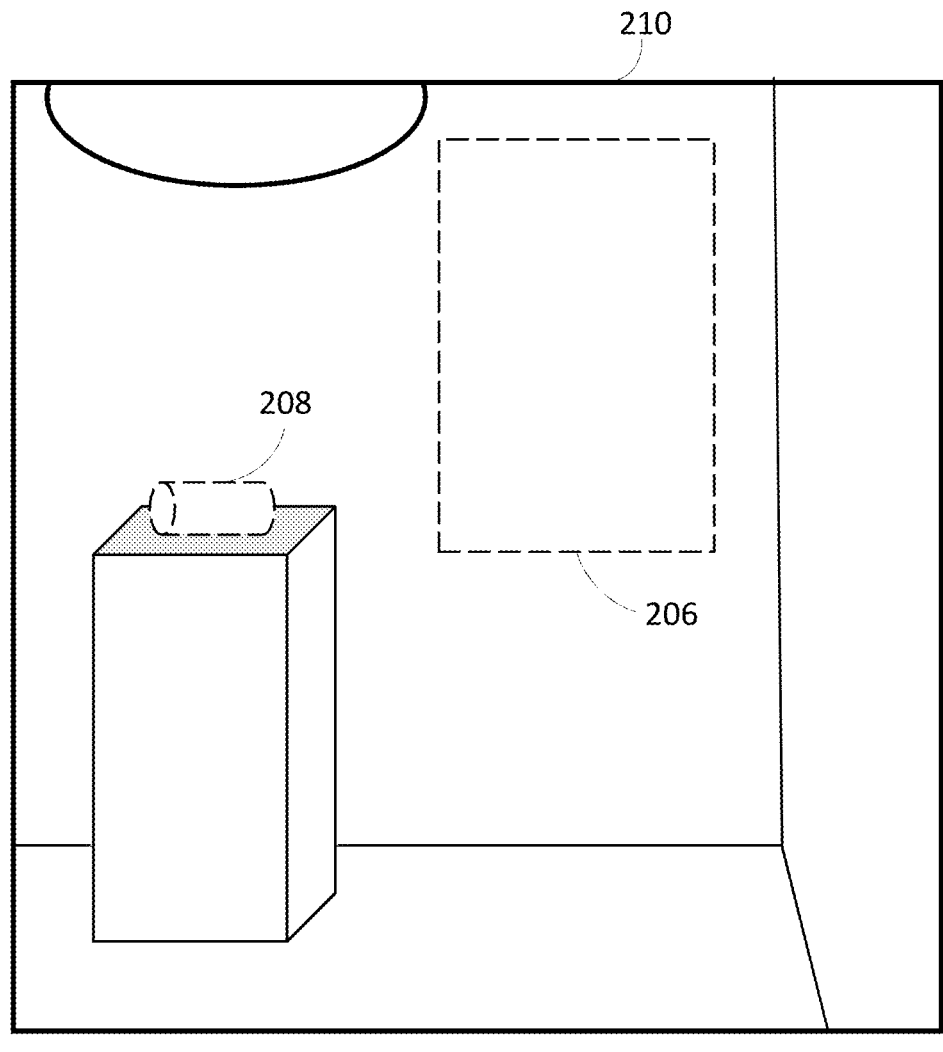

FIGS. 2B and 2C show a second virtual environment 210. In some embodiments, the second virtual environment 210 is a representation of the data received from the XR device described above. In some embodiments, the second virtual environment 210 is stored on a server. In some embodiments, the second virtual environment 210 is generated for display on a second XR device. In some embodiments, the second virtual environment 210 comprises a third virtual object 206 and a fourth virtual object 208. In some embodiments, the third virtual object 206 corresponds to the first virtual object 202 and the fourth virtual object 208 corresponds to the second virtual object 204. In some embodiments, the third virtual object 206 does not contain private information due to the transformation of the set of features related to the first virtual object 202.

In some embodiments, a server may process the data received from the XR device. For example, the server may generate one or more actions relating to one or more virtual objects in the second XR environment 210. In some embodiments, the server changes the position of the third virtual object 206 from a first position (shown in FIG. 2B) to a second position (shown in FIG. 2C). In some embodiments, the server changes the orientation of the fourth virtual object 208 from a first orientation (shown in FIG. 2B) to a second orientation (shown in FIG. 2C). In some embodiments, the one or more actions correspond to the server augmenting one or more virtual objects. For example, the server may change the color, texture, size, and/or shape of the third object 206. In another example, the server may augment the third object 206 by removing the third object 206 from the second XR environment 210. In some embodiments, the server generates the one or more actions based on interactive content provided by the server. For example, the server may provide home improvement services by displaying possible alternative layouts for furniture placement. In another example, the server may provide an interactive media viewing environment where characters in the media manipulate objects in the virtual environment 210.

Figure 2D:
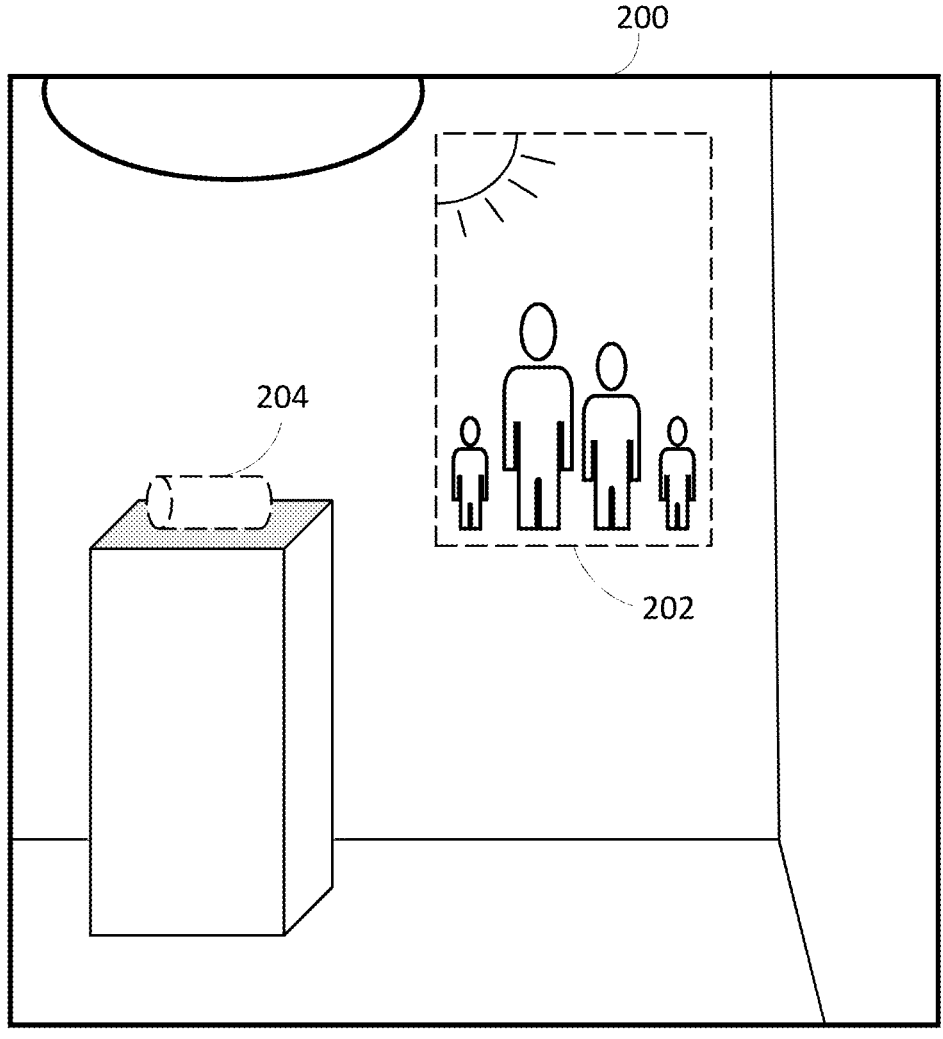

In some embodiments, the device that received the transformed set of features corresponding to the first virtual object 202 and the set of features corresponding to the second object 204 from the XR device transmits the processed data back to the XR device. The XR device can use the processed data to display one or more action associated with the processed data. For example, FIG. 2D shows the XR device displaying the first virtual environment 200 with the first virtual object 202 and the second virtual object. FIG. 2D also shows the XR device displaying one or more actions received from the server. For example, the position of the first virtual object 202 changes from a first position (shown in FIG. 2A) to a second position (shown in FIG. 2D) and the orientation of the second virtual object 204 changes from a first orientation (shown in FIG. 2A) to a second orientation (shown in FIG. 2D).

In some embodiments, the XR device displays one or more actions associated with the processed data by back transforming sets of features that were previously transformed by the XR device. For example, the XR device transformed the first set of features corresponding to the first virtual object 202 into a transformed feature set before sending the transformed feature set to the device. The XR device may back transform the transformed feature set received from the device and display any changes (e.g., change of position). In some embodiments, the XR device displays one or more actions associated with the processed data without back transforming the received data. For example, the XR device did not transform the second set of features corresponding to the second virtual object 204 because the second virtual object was not classified as an object type (e.g., private) requiring transformation. Accordingly, the XR device may display the actions (e.g., change of orientation) associated with the second virtual object 204 received from the device without any back transforming.

Figure 3A:
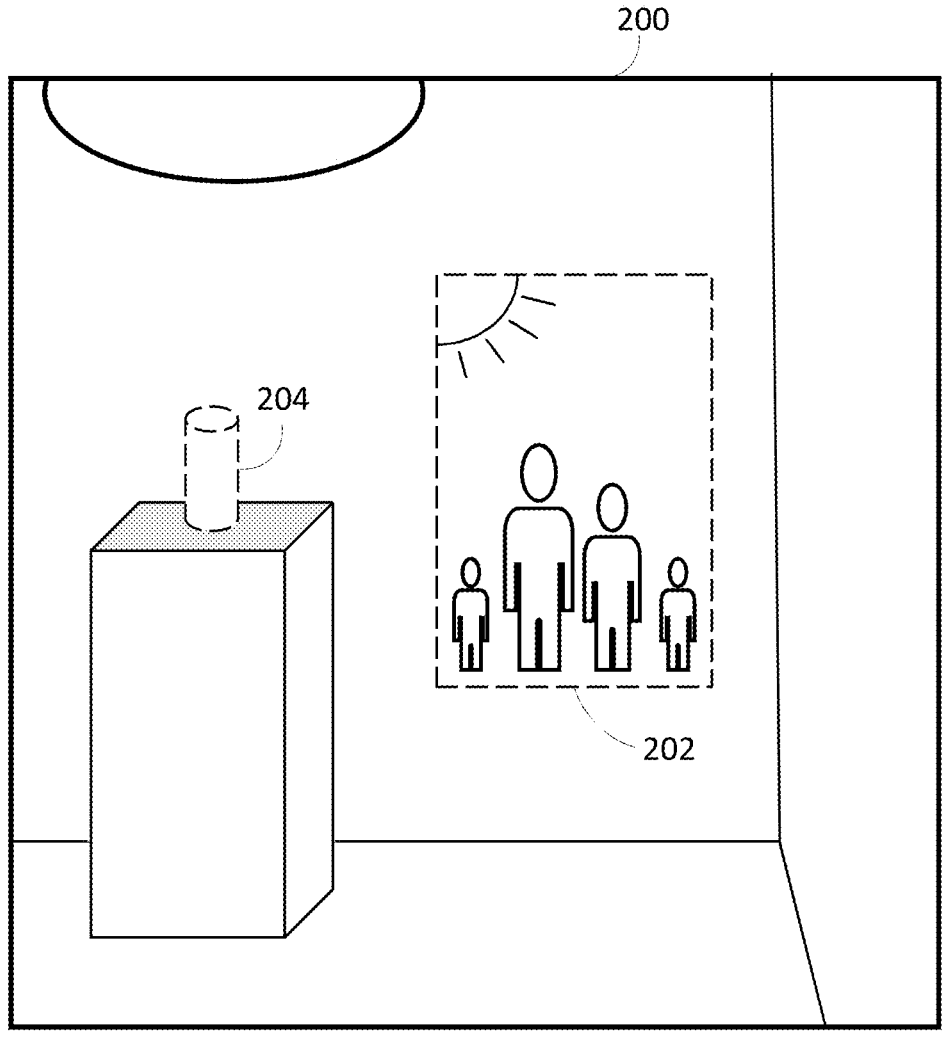
FIGS. 3A-3D show additional illustrative diagrams of a system for providing privacy while allowing interactions with virtual representations of sensitive objects, in accordance with some embodiments of the disclosure.

FIGS. 3A-3D show additional illustrative diagrams of a system for providing privacy while allowing interactions with virtual representations of sensitive objects, in accordance with some embodiments of the disclosure. In some embodiments, FIG. 3A shows the same or similar systems and/or methodologies described in FIG. 2A above. In some embodiments, FIG. 3A shows the first virtual environment 200 displayed by an XR device (e.g., XR device 102) for a user (e.g., user 104). In some embodiments, the first virtual environment 200 corresponds to a real-world environment (e.g., environment 110). In some embodiments, the XR device receives data related to a real-world environment and extracts a plurality of features from the received data to identify one or more real-world objects. In some embodiments, the XR device uses the received data to display a first real-world object (e.g., first object 106) as a first virtual object 202 and a second real-world object (e.g., second object 108) as the second virtual object 204 in the first virtual environment 200.

In some embodiments, the XR device transforms features of virtual objects corresponding to a certain type. For example, the XR device may use a classification algorithm to determine that the first virtual object 202 corresponds to a private object. In some embodiments, the XR device transforms a first set of features relating to the first virtual object 202 because the first virtual object is classified as a private object and the XR device does not transform a second set of features relating to the second virtual object 204 because the second virtual object is classified as a public object. The XR device may send the transformed set of features corresponding to the first virtual object 202 and the second set of features corresponding to the second virtual object 204 to a device.

Figure 3B:
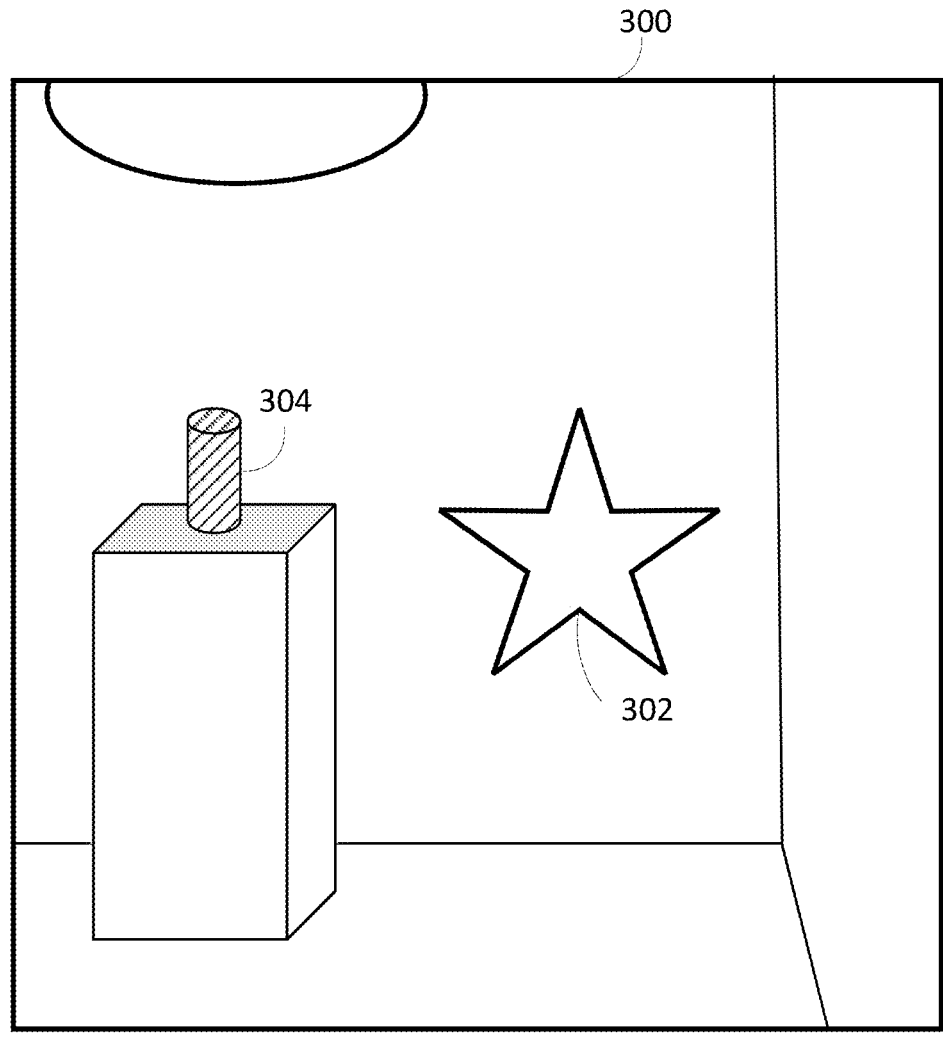
Figure 3C:
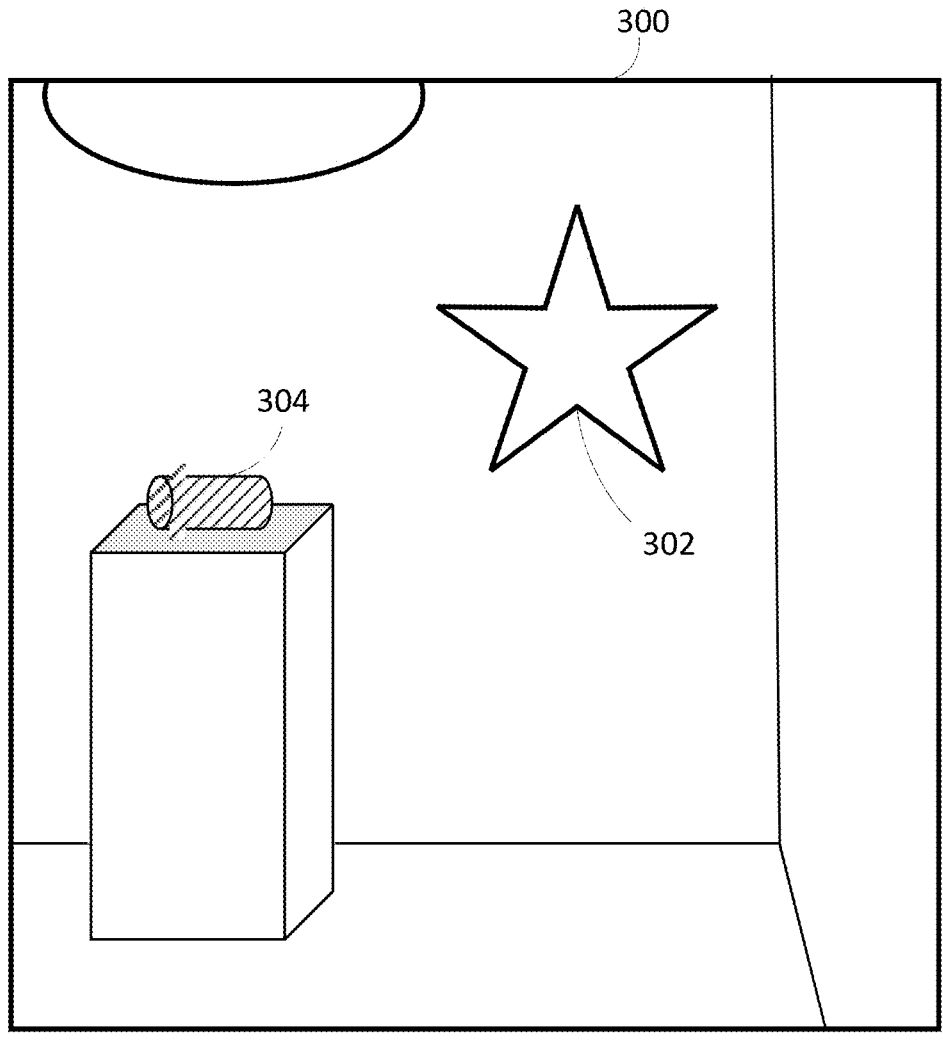

FIGS. 3B and 3C show a third virtual environment 300. In some embodiments, the third virtual environment 300 is a representation of the data received from the XR device described above. In some embodiments, the third virtual environment 300 is generated for display on a second XR device.

In some embodiments, the device compares the data received from the XR device to one or more objects stored in a database. For example, the device may compare the second set of features relating to the second virtual object 204 to a database of previously stored objects. In some embodiments, the device stores an object in the database whenever the device receives a set of features that do not match a previously stored object and cannot be mapped to a previously stored object. For example, if the second set of features relating to the second virtual object 204 does not match a previously stored object and cannot be mapped to a previously stored object, the device stores the second set of features relating to the second virtual object 204 in the database and generates the sixth virtual object 304 based on the second set of features.

In some embodiments, sets of features marked as transformed are only compared to previously stored transformed objects. For example, the data received from the XR device may comprise metadata with a first identifier associated with the transformed set of features corresponding to the first virtual object 202. In some embodiments, the identifier indicates that the transformed set of features correspond to a transformed object. The device may compare the transformed set of features to previously objects labeled as transformed and determine that the transformed set of features do not match any previously stored objects labeled as transformed and cannot be mapped to any previously stored objects labeled as transformed. In some embodiments, the device stores the transformed set of features relating to the first virtual object 202 in the database and generates the fifth virtual object 302 based on the transformed set of features. In some embodiments, the database of previously stored objects may indicate which of the previously stored objects are transformed objects or there may be a second database reserved for previously stored transformed objects.

In another example, if the transformed set of features relating to the first virtual object 202 do match a previously stored object (e.g., fifth virtual object 302), the device identifies the previously stored object and calculates the difference between the transformed set of features and the previously stored object. For example, the transformed set of features relating to the first virtual object 202 may correspond to the fifth virtual object 302 but may have different position coordinates (e.g., 10 centimeters to the right). In such an example, the device can update the database corresponding to the previously stored object (e.g., fifth virtual object 302) to indicate the new position coordinates and display the fifth virtual object 302 in the third virtual environment 300 according to the updated coordinates.

In another example, if the transformed set of features relating to the first virtual object 202 do not match a previously stored object, the device determines whether the transformed set of features may be mapped to a portion of a previously stored object. For example, more than one set of features may relate to a single object. In some embodiments, a third set of features correspond to an object (e.g., a virtual representation of a person) that is incomplete, and the transformed set of features may correspond to a portion of the object (e.g., arm of the virtual representation of the person). In such an example, the device can update the database corresponding to the previously stored object (e.g., virtual representation of a person). The device may update the set of features related to the previously stored object to include the transformed set of features. In such an example, the device may also store metadata indicating that the transformed set of features relates to the previously stored object.

In some embodiments, the device transmits updated data to a second XR device. In some embodiments, the device is a second XR device and displays the updated data as the third virtual environment 300. In some embodiments, the updated data comprises information about one or more existing virtual objects in the third virtual environment 300, information regarding generating a new virtual object in the third virtual environment 300, information related to the third virtual environment 300, and/or similar such information. In some embodiments, the information about one or more existing virtual objects comprises updates based on the transformed set of features corresponding to the first virtual object 202 received from the XR device. For example, the updated data may indicate that the fifth virtual object 302 should move 10 centimeters to the right based on the transformed set of features received from the XR device. In some embodiments, the second XR device displays the third virtual environment 300 based on the received updated data. For example, the second XR device may update the position of the fifth virtual object to be 10 centimeters to the right based on the received updated data.

FIG. 3C displays one or more actions in the third virtual environment 300. For example, a second XR device may display the third virtual environment 300 for a second user. The second user may input one or more actions on one or more virtual objects. For example, the second user may change the fifth virtual object 302 from a first position (e.g., shown in FIG. 3B) to a second position (e.g., shown in FIG. 3C). The second user may also change the sixth virtual object 304 from a first orientation (e.g., shown in FIG. 3B) to a second orientation (e.g., shown in FIG. 3C).

In some embodiments, the device that received the updated data transmits the processed data to the XR device. For example, the second XR device may transmit the processed data directly to the first XR device. In some embodiments, a server receives the processed data from the second XR device and transmits the processed data and/or additional information to the first XR device. In some embodiments the additional information comprises mapping information. For example, the mapping information may indicate that the fifth virtual object 302 corresponds to the first virtual object 202 and the sixth virtual object 304 corresponds to the second virtual object 204.

Figure 3D:
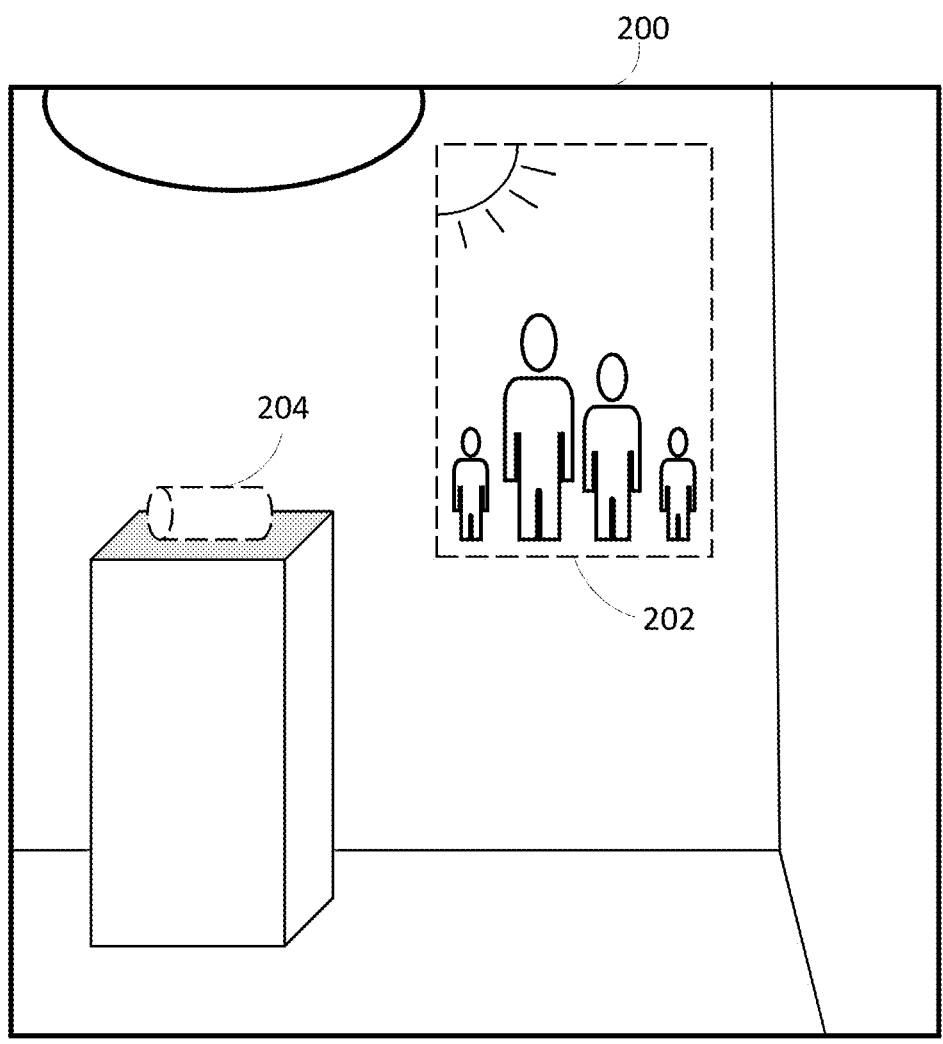

In some embodiments, the first XR device can use the processed data to display one or more actions associated with the processed data. For example, FIG. 3D shows the first XR device displaying the first virtual environment 200 with the first virtual object 202 and the second virtual object. FIG. 3D also shows the first XR device displaying the one or more actions associated with the processed data. For example, the position of the first virtual object 202 changes from a first position (shown in FIG. 3A) to a second position (shown in FIG. 3D) and the orientation of the second virtual object 204 changes from a first orientation (shown in FIG. 3A) to a second orientation (shown in FIG. 3D).

In some embodiments, the first XR device displays one or more actions associated with the processed data by back transforming sets of features that were previously transformed by the first XR device. For example, the first XR device transformed the first set of features corresponding to the first virtual object 202 into a transformed feature set before sending the transformed feature set to the device. The first XR device may back transform the transformed feature set received in the processed data and display any changes (e.g., change of position). In some embodiments, the first XR device displays one or more actions associated with the processed data without back transforming the received data. For example, the first XR device did not transform the second set of features corresponding to the second virtual object 204 because the second virtual object was not classified as an object type (e.g., private) requiring transformation. Accordingly, the first XR device may display the actions (e.g., change of orientation) associated with the second virtual object 204 received from the device without back transforming.

FIGS. 4A and 4B show illustrative diagrams of packet formats used to transmit information about virtual objects, in accordance with some embodiments of the disclosure. In some embodiments, a device (e.g., XR device 102 shown in FIG. 1) transmits a first packet 402 to a second device (e.g., server, second XR device, smartphone, desktop computer, etc.). In some embodiments, the first packet 402 comprises an object ID 404. One or more devices (e.g., XR device 102 shown in FIG. 1, server, second XR device, etc.) may use the object ID 404 to identify one or more virtual objects. For example, a first object ID may correspond to a first virtual object (e.g., the first virtual object 202 shown in FIG. 2A) and a second object ID may correspond to a second virtual object (e.g., the second virtual object 204 shown in FIG. 2A). In some embodiments, the first packet 402 also comprises a protection class 406. The protection class 406 may indicate the type of object corresponding to the object identified by the object ID 404. For example, if the object ID 404 corresponds to the first virtual object 202, then the protection class may indicate a first type of object (e.g., private object).

In some embodiments, the first packet 402 comprises transformed features 410. In some embodiments, the transformed features 410 correspond to the transformed plurality of features relating to the virtual object identified by the object ID 404. For example, if the object ID 404 corresponds to the first virtual object 202, then the transformed features 410 may correspond to the transformed plurality of features associated with the first virtual object 202. The plurality of features associated with the first virtual object 202 may be transformed using a feature transform corresponding to a transform key associated with the protection class 406. In some embodiments, the first packet 402 also comprises metadata 414. The metadata 414 may comprise additional information about the virtual object identified by the object ID 404 and/or about the protection class 406. For example, the additional information may include camera settings associated with the capturing of the features associated with the virtual object, ambient conditions related to environment (e.g., environment 110 shown in FIG. 1), shape parameters related to the virtual object and/or real-world object, and/or similar such information.

In some embodiments, the first packet 402 also comprises a key identifier 408 and an encrypted object 412. In some embodiments, the encrypted object 412 comprises an encrypted portion of the transformed plurality of features relating to the virtual object identified by the object ID 404. For example, the encrypted object 412 may comprise a first encrypted portion of the transformed plurality of features relating to the virtual object identified by the object ID 404 while the transformed features 410 may comprise a second unencrypted portion of the transformed plurality of features relating to the virtual object identified by the object ID 404. In some embodiments, all of the of the transformed plurality of features relating to the virtual object identified by the object ID 404 are encrypted and stored as the encrypted object 412. In some embodiments, the key identifier 408 identifies an encryption key required to unencrypt the encrypted object 412. For example, a server may receive the first packet 402 and use the key identifier 408 to identify a first encryption key. The server can use the first encryption key to decrypt the encrypted object 412. FIG. 4A displays one example of a format for the first packet 402, but any number of different variations of may be used. In some embodiments, the first packet 402 comprises additional components not displayed in FIG. 4A. In some embodiments, the first packet 402 comprises less components than displayed in FIG. 4A. For example, the key identifier 408 and encrypted object 412 may not be necessary in some embodiments that do not utilize encryption.

In some embodiments, a second device transmits the second packet 416 to the first device that transmitted the first packet 402. In some embodiments, one or more portions of the second packet 416 are the same or similar to one or more portions of the first packet 402. For example, the object ID 404 and protection class 406 may be the same for the first packet 402 and the second packet 416. In some embodiments, the object ID 404 for the first packet 402 may correspond to a first identifier (e.g., 001) and the object ID 404 for the second packet 416 may correspond to a second identifier (e.g., 002), but both identifiers may correspond to the same virtual object. For example, the first identifier may be unique to the first device when identifying the virtual object and the second identifier may be unique to the second device when identifying the same virtual object.

In some embodiments, the second packet 416 comprises image processing instructions 418 related to the virtual object identified by the object ID 404. In some embodiments, the image processing instructions correspond to one or more actions to be applied to the virtual object identified by the object ID 404. For example, the one or more actions may include changing the position, changing the orientation, changing the size, and/or changing the shape of the virtual object identified by the object ID 404. In some embodiments, the one or more actions are generated by the second device. In some embodiments, the one or more actions are received from another device (e.g., second XR device). FIG. 4B displays one example of a format for the second packet 416, but any number of different variations may be used. In some embodiments, the second packet 416 comprises additional components not displayed in FIG. 4B. In some embodiments, the second packet 416 comprises less components than displayed in FIG. 4B. For example, the key identifier 408 of the second packet 416 and encrypted object 412 of the second packet 416 may not be necessary in some embodiments that do not utilize encryption.

Figure 5:
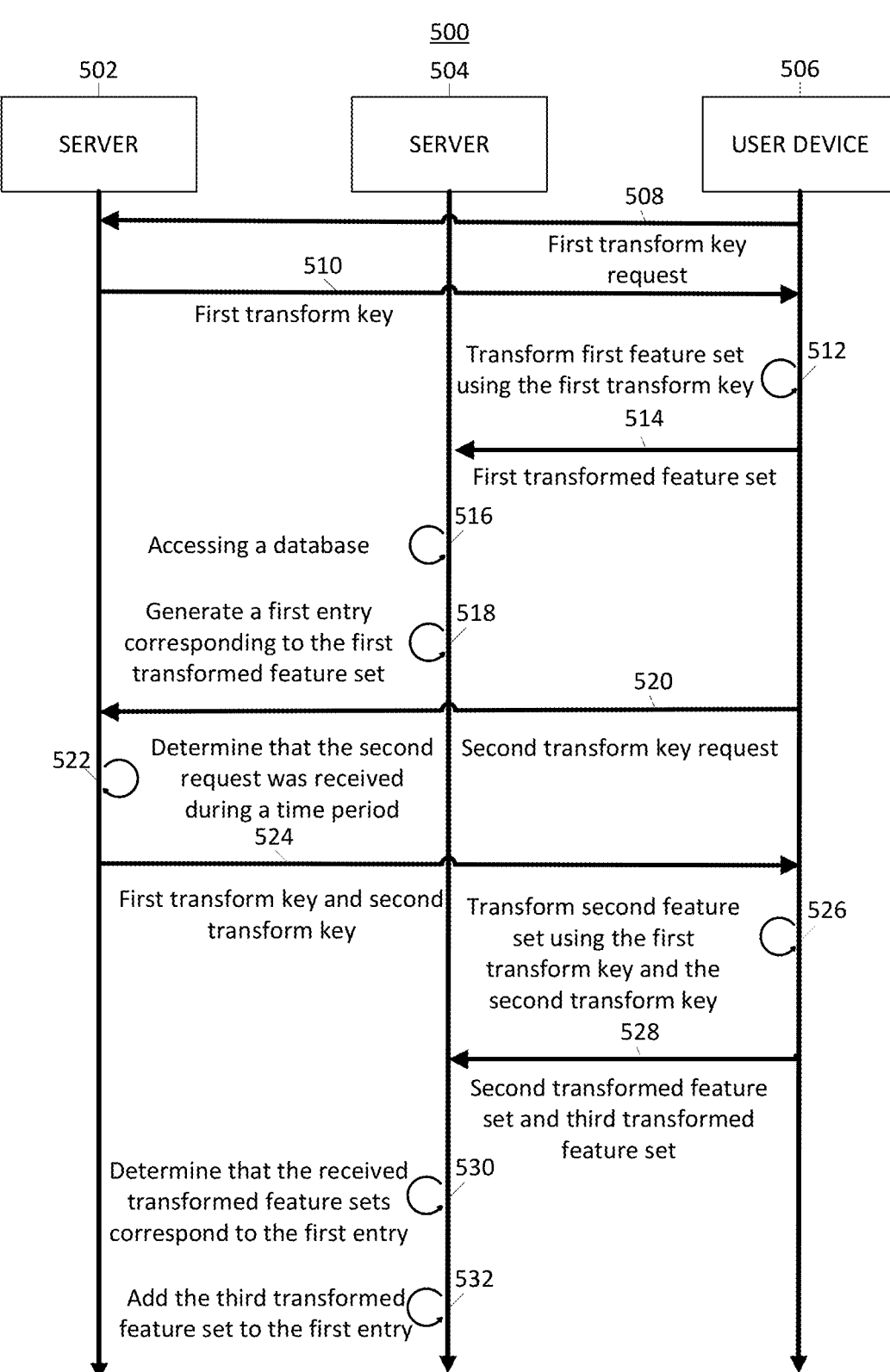
FIG. 5 shows an illustrative flowchart of a process for updating one or more transform keys, in accordance with some embodiments of the disclosure.

FIG. 5 shows an illustrative flowchart of a process 500 for updating one or more transform keys, in accordance with some embodiments of the disclosure. In some embodiments, some steps of process 500 may be performed by one of several devices. Although a first server 502, a second server 504, and a user device 506 are shown any number of servers and/or user devices may be used. In another example, the first server 502 and the second server 504 may be a single server. Although the process 500 is illustrated and described as a sequence of steps, it is contemplated that various embodiments of process 500 may be performed in any order or combination and need not include all the illustrated steps. In some embodiments, the user device 506 is one or more devices capable of displaying XR media. In some embodiments, the first server 502 is a key server and the second server 504 is an XR server.

At step 508, the user device 506 transmits a first transform key request to the first server 502. In some embodiments, the user device 506 transmits this request in response to determining that a first feature set corresponding to a first virtual object should be transformed before transmitting the first feature set to the second server 504. In some embodiments, the first transform key request indicates an object type. For example, the first transform key request may request one or more transform keys associated with a first object type (e.g., private).

At step 510, the first server 502 transmits a first transform key to the user device 506. In some embodiments, first server 502 has access to a database with a plurality of entries linking transform keys and corresponding transform algorithms to object types. For example, the first transform key and a first transform algorithm may be associated with a first object type (e.g., private). In some embodiments, the first server 502 transmits more than one transform key. For example, the first transform key request received at step 508 may indicate a first object type (e.g., private) and a second object type (e.g., age-restricted). In response, the first server 502 may transmit a first transform key corresponding to the first object type and a second transform key corresponding to the second object type to the user device 506.

At step 512, the user device 506 transforms a first feature set using the first transform key. For example, the user device 506 may determine that feature sets (e.g., first feature set) corresponding to virtual objects (e.g., first virtual object) of a certain type (e.g., first object type) should be transformed before transmitting the first feature set to the second server 504. In some embodiments, the user device 506 transforms the first feature set corresponding to the first virtual object into a first transformed feature set using the first transform algorithm associated with the first transform key.

At step 514, the user device 506 transmits the first transformed feature set to the second server 504. In some embodiments, the user device 506 transmits the first transformed feature set using one or more packets (e.g., first packet 402). At step 516, the second server 504 accesses a database linking feature sets corresponding to virtual objects with avatars. For example, an entry may link a first avatar to a transformed feature set corresponding to a virtual object.

At step 518, the second server 504 generates a first entry corresponding to the first transformed feature set. In some embodiments, the second server 504 generates a new entry whenever the second server 504 receives a transformed feature set that does not match and/or cannot be mapped to a previously stored feature set. In some embodiments, if a received transformed feature set does match and/or can be mapped to another entry corresponding to a previously stored transformed feature set, then the second server updates the corresponding entry.

At step 520, the user device 506 transmits a second transform key request to the first server 502. In some embodiments, the user device 506 transmits this request in response to determining that a second feature set corresponding to the first virtual object should be transformed before transmitting the second feature set to the second server 504. In some embodiments, the second transform key request indicates the object type of the first virtual object.

At step 522, the first server 502 determines that the second request was received during a time period. In some embodiments, the time period corresponds to a key update time period. In some embodiments, the time period begins after a threshold amount of time has passed since the generation of the first transform key. For example, the key update time period may begin 10 days after the first transform key is generated. 10 days is only one example, any amount of time may be used. In some embodiments, the time period begins after a threshold number of feature sets have been transformed using the first transform key. For example, the first time period may begin after the user device 506 has transformed 1,000 feature sets using the first transform key. 1,000 transformations is only one example, any number of transformations may be used.

At step 524, the first server 502 transmits the first transform key and a second transform key to the user device 506. In some embodiments, the first server 502 also updates a database with a plurality of entries linking transform keys and corresponding transform algorithms to object types. For example, the first server 502 may update a first entry linking the first transform key to the first object type to include the second transform key. Accordingly, the first entry would link the first transform key and the second transform key to the first object type. In some embodiments, the first server 502 indicates that the first transform key and the second transform key both correspond to objects of a certain type when the first server 502 transmits the first transform key and the second transform key to the user device 506.

At step 526, the user device 506 transforms a second feature set using the first transform key and the second transform key. For example, the user device 506 may determine that feature sets (e.g., second feature set) corresponding to virtual objects (e.g., first virtual object) of a certain type (e.g., first object type) should be transformed before transmitting the second feature set to the second server 504. In response to receiving the first transform key and the second transform key from the first server 502, the user device 506 may (i) transform the second features set corresponding to the first virtual object into a second transformed feature set using the first transform algorithm associated with the first transform key and (ii) transform the second features set corresponding to the first virtual object into a third transformed feature set using the second transform algorithm associated with the second transform key.

At step 528, the user device 506 transmits the second transformed feature set and the third transformed feature set to the second server 504. In some embodiments, the user device 506 transmits the second transformed feature set and/or the third transformed feature set using one or more packets (e.g., first packet 402).

At step 530, the first server 502 determines that the received transformed feature sets correspond to the first entry. In some embodiments, the first server 502 determines that the second transformed feature set matches and/or can be matched to the first entry corresponding to the first transformed feature set. In some embodiments, the first server 502 makes this determination using one or more portions of the second transformed feature set. For example, a portion of the second feature set may be the same or within a difference threshold to a portion of the first transformed feature set. If the first server 502 determines that second transform feature set corresponds to the first entry, the first server 502 adds the third transformed feature set to the first entry at step 532. As a result, the first entry is updated to link the first avatar to the second transformed feature set and the third transformed feature set.

In some embodiments, the second server 504 deletes the first transformed feature set and the second transformed feature set from the first entry so that only the third transformed feature set is linked to the first avatar. Accordingly, the first entry only comprises transformed feature sets corresponding to the second transform key. In some embodiments, the second server 504 sends a message to the user device 506 and/or the first server 502 indicating that the first transform key should no longer be used. For example, the message may indicate that the number of entries comprising transformed features associated with the first transform key is below a threshold number of entries.

FIG. 6 shows another illustrative flowchart of a process 600 for updating one or more transform keys, in accordance with some embodiments of the disclosure. In some embodiments, some steps of process 600 may be performed by one of several devices. Although a first server 602, a second server 604, and a user device 606 are shown any number of servers and/or user devices may be used. In another example, the first server 602 and the second server 604 may be a single server. Although the process 600 is illustrated and described as a sequence of steps, it is contemplated that various embodiments of process 600 may be performed in any order or combination and need not include all the illustrated steps. In some embodiments, the user device 606 is one or more devices capable of displaying XR media. In some embodiments, the first server 602 is a key server and the second server 604 is an XR server.

In some embodiments, process 600 is used in systems where different parts of a transform algorithms are used to transform different portions of a feature set. For example, a first portion of a transformed feature set may be generated using a first part of a transform algorithm and a second portion of the transformed feature set may be generated using a second part of the transform algorithm. In some embodiments, the first part of the transform algorithm used to generate the first portion of the transformed feature set satisfies a permutation property and the second part of the transform algorithm used to generate the second portion of the transformed feature set satisfies a liner property. In some embodiments, the first part of the transform algorithm and the second part of the transform algorithm are associated with a single transform key. In some embodiments, the following is assumed for process 600:

$$P_i = Tr(k_c, KI_c, F_i) = PT_i, PV_i = (pt_{io}, pt_{i1}, \dots, pt_{ik-1}), \tag{1}$$

$$((pv_{io}, I_o), (pv_{i1}, I_1) \dots, (pv_{is-1}, I_{s-1})) \tag{}$$

$$(pt_{io}, pt_{i1}, \dots, pt_{ik-1}) = Tr1(k_c, F_i) \tag{2}$$

$$(pv_{io}, pv_{i1}, \dots, pv_{is-1}) = Tr2(KI_c, F_i) \tag{3}$$

$$pt_{ij} = PE(k_c, f_{ij}) \tag{4}$$

$P_i$: A set of features for a virtual object transformed using $k_c$ and optionally $KI_c$.

Tr: A general feature transform.

Tr1: A first suitable feature transform.

Tr2: A second suitable feature transform.

$k_c$: a generic feature transform key used to transform objects belonging to class c.

KI: Index master secret.

c: The object class (e.g., type).

$F_i$: Plurality of features for a first object.

$PT_i$: A permutation of first portion of features.

$PV_i$: A linear transform of second portion of features.

$PE(k_c, x)$: A permutation of x defined by $k_c$.

Using these assumptions we can assume:

$$PE(k'_c, x) = PE(k^{\wedge}_c, PE(k_c, x)) \tag{5}$$

$k'_c$: new generic feature transform key used to transform objects belonging to class c.

Equation 5 is the permutation that results when first applying the permutation defined by $k_c$, then applying the permutation defined by $k^{\wedge}_c$. This implies that $$pt'_{ij} = PE(k'_c, f_{ij}) = PE(k^{\wedge}_c, PE(k_c, f_{ij})) \tag{6}$$

At step 608, the first server generates a first transform key corresponding to a first transform algorithm. In some embodiments, the first transform algorithm has a first part and a second part as described above. In some embodiments, the first transform key is associated with an object type (e.g., private). In some embodiments, the first server uses a key generation function (KGF) to generate one or more transform keys. In some embodiments, a KGF uses a master key, random data, auxiliary data, iteration information, and/or similar such information as inputs and outputs a transform key (e.g., first transform key). For example:

$$k_c = KGF(K, c, \text{Label}, L, q) \tag{7}$$

$k_c$: a generic feature transform key used to transform objects belonging to class c.

K: The maser secret.

c: The object class (e.g., type).

Label: Label.

L: Key length.

q: Counter.

I: key index (optional).

In some embodiments, the KGF uses a Pseudo Random Function (PRF) when generating the first transform key.

At step 610, the first server 602 transmits the first transform key to the user device 606. In some embodiments, the first server 602 has access to a database with a plurality of entries linking transform keys and corresponding transform algorithms to object types. For example, the first transform key and a first transform algorithm may be associated with a first object type (e.g., private). In some embodiments, the first server 602 transmits the first transform key in response to receiving a first transform key request from the user device 606. For example, the user device 606 may transmits the first transform key request in response to determining that a first feature set corresponding to a first virtual object that should be transformed before transmitting the first feature set to the second server 604.

At step 612, the user device 606 transforms a first feature set using the first transform key. For example, the user device 606 may determine that feature sets (e.g., first feature set) corresponding to virtual objects (e.g., first virtual object) of a certain type (e.g., first object type) should be transformed before transmitting the first feature set to the second server 604. In some embodiments, the user device 606 transforms the first feature set corresponding to a first virtual object into a first transformed feature set using the first transform algorithm associated with the first transform key. In some embodiments, the user device transforms a first portion of the first feature set using a first part of the first transform algorithm and a second portion of the first feature set using a second part of the first transform algorithm to generate the first transformed feature set.

At step 614, the user device 506 transmits transformed features to the second server 604. In some embodiments, the transformed features comprise a plurality of transformed feature sets corresponding to virtual objects of a first object type. For example, the transformed features may comprise the first transformed feature set generated at step 612, and a second transformed feature set corresponding to a second virtual object, wherein the first virtual object and the second virtual object are both categorized as the first object type (e.g., private). In some embodiments, the user device 506 transmits the transformed features using one or more packets (e.g., first packet 402).

At step 616, the first server 602 initializes a key update. In some embodiments, the first server 602 initialize the key updated during a time period corresponding to a key update time period. In some embodiments, the time period begins after a threshold amount of time has passed since the generation of the first transform key. For example, the key update time period may begin 10 days after the first transform key is generated. 10 days is only one example, any amount of time may be used. In some embodiments, the time period begins after a threshold number of feature sets have been transformed using the first transform key. For example, the first time period may begin after the user device has transformed 1,000 feature sets using the first transform key. 1,000 transformations is only one example, any number of transformations may be used. In some embodiments, the initialization is in response to receiving an input from a device (e.g., second server 604, user device 606, etc.)

At step 618, the first server generates a second transform key corresponding to a second transform algorithm. In some embodiments, the second transform algorithm has a first part and a second part as described above. In some embodiments, the second transform key is associated with the first object type (e.g., private). In some embodiments, the first server uses the key generation KGF described at step 608 to generate the second transform key. For example, $$k'_c = KGF(K, c, \text{Label}, L, q_{new}) \tag{8}$$

$k'_c$: new transform key used to transform objects belonging to class c.

$q_{new}$: new counter value.

At step 620, the first server 602 transmits a feature request to the second server 604. In some embodiments, the feature request indicates a type of object associated with the requested features. For example, the feature request may indicate a plurality of transformed features relating to a plurality of objects of the first object type.

At step 622, the second server 604 transmits a plurality of features to the first server 602. In some embodiments, the plurality of features comprise a plurality of transformed features relating to a plurality of objects of the first object type. For example, the plurality of features may comprise the first transformed feature received by the second server 604 at step 614, wherein the first transformed feature set was generated by the user device 606 using the first transform key at step 612.

At step 624, the first server determines a mathematical relationship between the first transform key and the second transform key. For example:

$$M = KGF(K, c, \text{Label}, L, q_{new}) - KGF(K, c, \text{Label}, L, q)\text{mod}2^w \tag{9}$$

M: Mathematical relationship.
w: size of the transform key in bits.

In another example:

$$MI = \tag{10}$$
$$KGF(KI, c, \text{Label}, L, q_{new}, I) - KGF(KI, c, \text{Label}, L, q, I)\text{mod}2^w$$

MI: Index-specific mathematical relationship.
KI: Index master secret.
I: Set of key indices.

At step 626, the first server 602 generates an updated portion of a first transformed feature set. In some embodiments, the second server 604 receives the first transformed feature set as one of the plurality of features 622 received at step 622. In some embodiments, the first transformed feature set was generated at step 612 and transmitted at step 614. In some embodiments, the first transformed feature set comprises a first portion and a second portion. For example, a first portion of the first transformed feature set may correspond to sensitive features and a second portion of the first transformed feature set may correspond to non-sensitive features (e.g., location features). In some embodiments, the second server generates an updated portion of the first transformed feature set using the first portion of the first transformed feature set and a first part of the second transform algorithm corresponding to the second transform key. In some embodiments, the first server 602 generates an updated portion of the first feature set using one or more of the following equations:

$$PT'_{i,} = (pt'_{io}, pt'_{i1}, \ldots, pt'_{ik-1}) \tag{11}$$

$$pt'_{ij} = PE(k'_c, pt_{ij}) \tag{12}$$

At step 628, the first server 602 transmits a message to the second server 604. In some embodiments, the message comprises the mathematical relationship determined at step 624 and the updated portion of the first transformed feature set generated at step 626. In some embodiments, the message also comprises additional information (e.g., one or more indices). For example, a first piece of information may indicate that the updated portion of the first transformed feature set corresponds to the first transformed feature set. In another example, a second piece of information may indicate that the mathematical relationship is associated with virtual objects of the first object type.

At step 630, the second server 604 access a database. In some embodiments, the database comprises a plurality of entries linking a plurality of transformed feature sets corresponding to a plurality of virtual objects to a plurality of avatars. For example, a first entry may link the first transformed feature set corresponding to the first virtual object to a first avatar.

At step 632, the second server 604 identifies a first entry corresponding to the first transformed feature set. In some embodiments, the second server 604 uses additional information received in the message received at step 628 to identify the first entry. For example, the second server 604 may determine that the updated portion of the first transformed feature set corresponds to the first entry based on one or more indices.

At step 634, the second server 604 updates the first entry in the database. In some embodiments the second server 604 updates the first entry using the mathematical relationship and the updated portion of the first transformed feature set.

In some embodiments, the second server 604 replaces the first portion of the first transformed feature set stored in the first entry with the received updated portion of the first transformed feature set. In some embodiments, the second server 604 uses the received mathematical relationship to update the second portion of the first transformed feature set. For example, the second server 604 may use the received mathematical relationship and the stored second portion of the first transformed feature set to calculate an updated second portion of the first transformed feature set. In some embodiments, the second server 604 uses the following equation when updating the second portion of the first transformed feature set:

$$pv'_{ij} = pv_{ij} + MI \bmod 2^w \qquad (13)$$

At step 636, the first server 602 transmits the second transform key to the user device 606. In some embodiments, the first server 602 transmits the second transform key to the user device 606 after a threshold number of entries stored at the second server 604 are updated. In some embodiments, steps 620-634 are repeated until the threshold number of entries stored at the second server 604 are updated. In some embodiments, the first server 602 also indicates to the user device 606 to discard the first transform key when the second transform key is transmitted.

Figure 7:
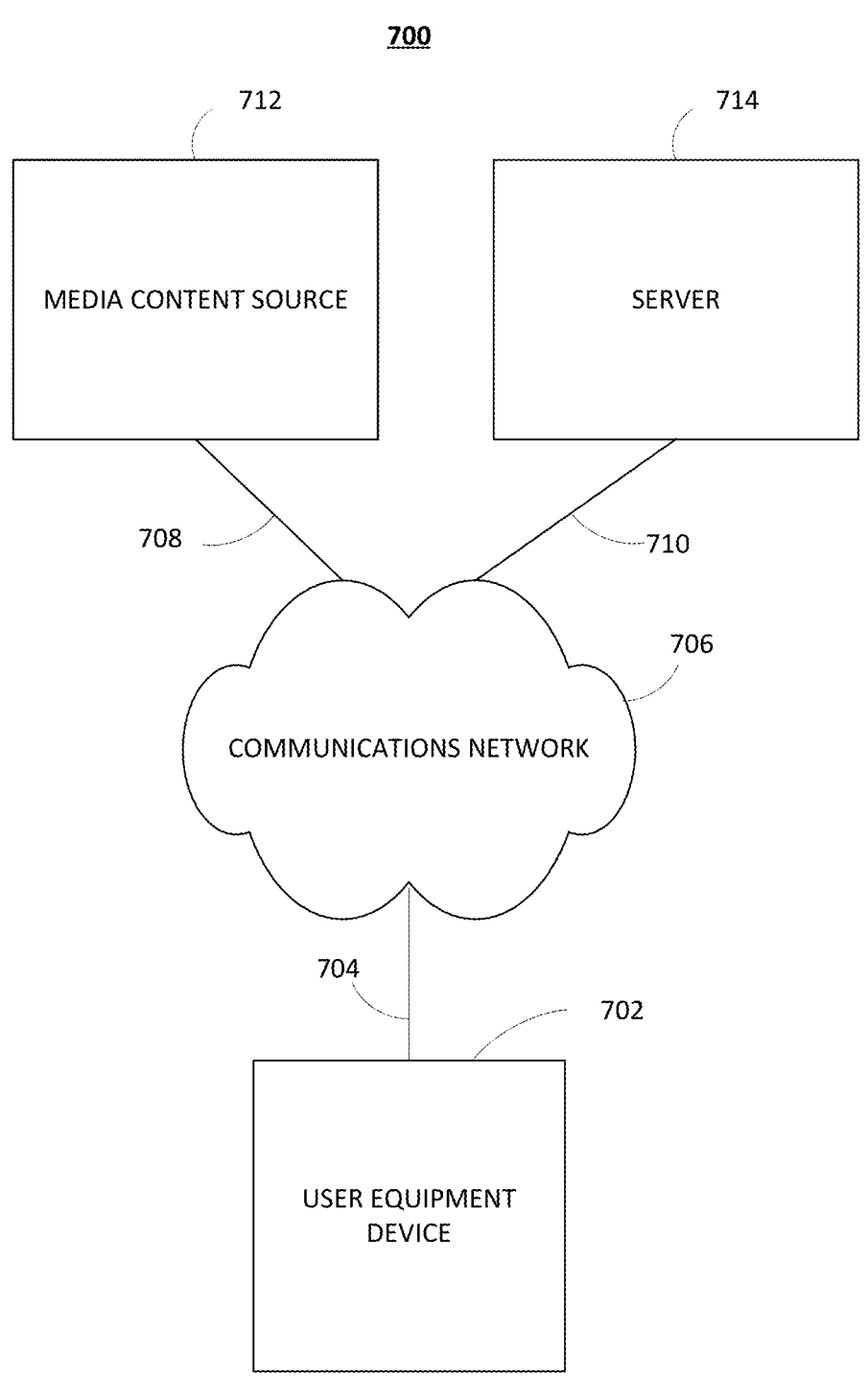
FIG. 7 shows an illustrative block diagram of a media system, in accordance with embodiments of the disclosure.
Figure 8:
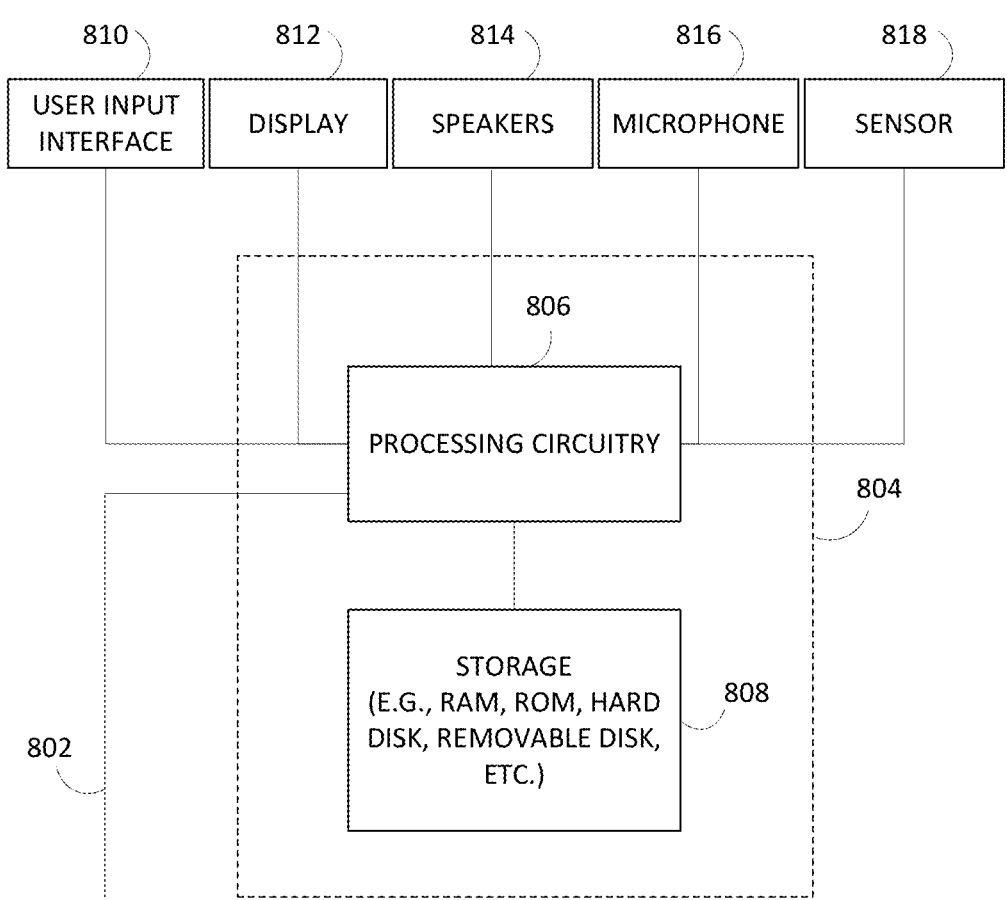
FIG. 8 shows an illustrative block diagram of a user equipment device system, in accordance with some embodiments of the disclosure.
Figure 9:
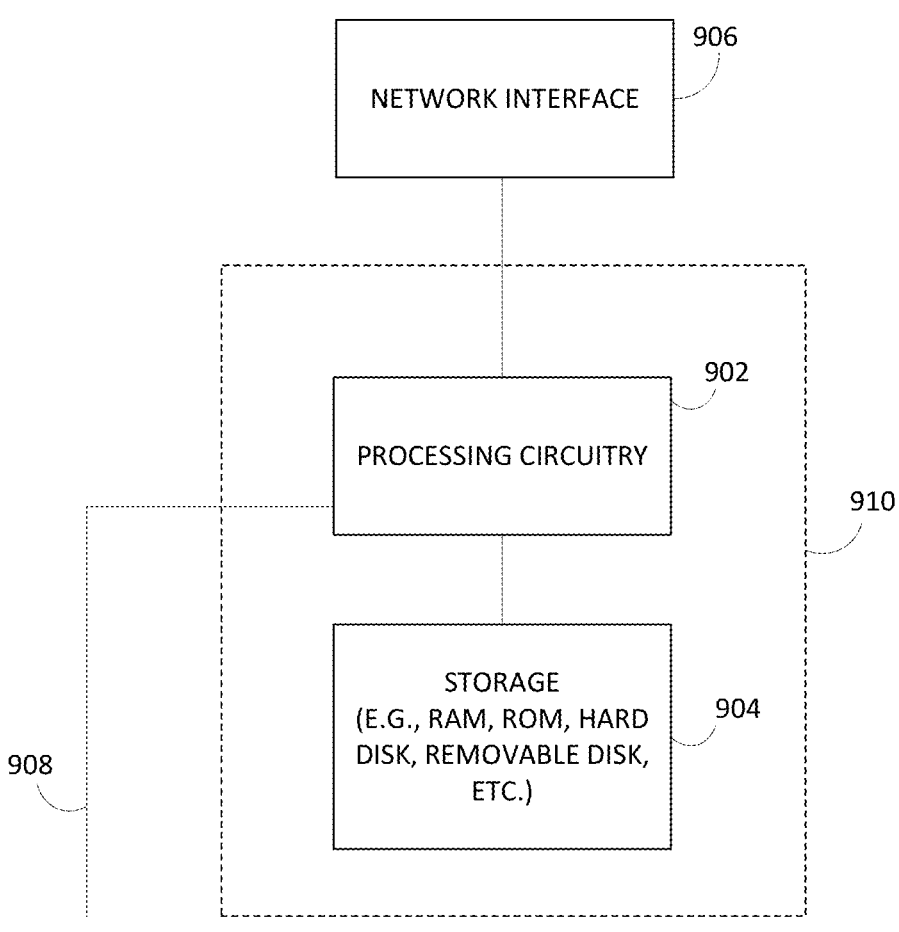
FIG. 9 shows an illustrative block diagram of a server system, in accordance with some embodiments of the disclosure.

FIGS. 7-9 describe exemplary devices, systems, servers, and related hardware for providing privacy while allowing interactions with virtual representations of sensitive objects, in accordance with some embodiments. In the system 700, there can be more than one user equipment device 702 but only one is shown in FIG. 7 to avoid overcomplicating the drawing. In addition, a user may utilize more than one type of user equipment device 702 and more than one of each type of user equipment device. As described above, the user equipment device 702 may be an XR device. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. In an embodiment, the user equipment devices may also communicate with each other directly through an indirect path via the communications network 706.

The user equipment devices may be coupled to communications network 706. Namely, the user equipment device 702 is coupled to the communications network 706 via communications path 704. The communications network 706 may be one or more networks including the Internet, a mobile phone network, mobile voice or data network (e.g., a 4G, 5G, or LTE network), cable network, public switched telephone network, or other types of communications network or combinations of communications networks. The path 704 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 704 can be a wireless path. Communication with the user equipment device may be provided by one or more communications paths but is shown as a single path in FIG. 7 to avoid overcomplicating the drawing.

The system 700 also includes media content source 712, and server 714, which can be coupled to any number of databases providing information to the user equipment devices. For example, media content source 712 and server 714 may have access to augmentation data, 2D mapping data, 3D mapping data, virtual object data, user information, transform key data, encryption data, and/or similar such information. The media content source 712 represents any computer-accessible source of content, such as a storage for audio content, metadata, or, similar such information. The server 714 may store and execute various software modules for the interactions with virtual representations of sensitive objects functionality. In the system 700, there can be more than one server 714 but only one is shown in FIG. 7 to avoid overcomplicating the drawing. In addition, the system 700 may utilize more than one type of server 714 and more than one of each type of server (e.g., a key server, object database server, etc.). In some embodiments, the user equipment device 702, media content source 712, and server 714 may store metadata associated with media content.

FIG. 8 shows a generalized embodiment of a user equipment device 800, in accordance with one embodiment. In an embodiment, the user equipment device 800 is an example of the user equipment devices described in FIGS. 1-6 (e.g., XR device 102, XR device 506). In an embodiment, the user equipment device 800 is a headset (e.g., an XR headset). The user equipment device 800 may receive content and data via input/output (I/O) path 802. The I/O path 802 may provide audio content (e.g., broadcast programming, on-demand programming, Internet content, content available over a local area network (LAN) or wide area network (WAN), and/or other content) and data to control circuitry 804, which includes processing circuitry 806 and a storage 808. The control circuitry 804 may be used to send and receive commands, requests, and other suitable data using the I/O path 802. The I/O path 802 may connect the control circuitry 804 (and specifically the processing circuitry 806) to one or more communications paths. I/O functions may be provided by one or more of these communications paths but are shown as a single path in FIG. 8 to avoid overcomplicating the drawing.

The control circuitry 804 may be based on any suitable processing circuitry such as the processing circuitry 806. As referred to herein, processing circuitry should be understood to mean circuitry based on one or more microprocessors, microcontrollers, digital signal processors, programmable logic devices, field-programmable gate arrays ("FPGAs"), application-specific integrated circuits ("ASICs"), etc., and may include a multi-core processor (e.g., dual-core, quad-core, hexa-core, or any suitable number of cores) or super-computer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). The interactions with virtual representations of sensitive objects functionality can be at least partially implemented using the control circuitry 804. The interactions with virtual representations of sensitive objects functionality described herein may be implemented in or supported by any suitable software, hardware, or combination thereof. The providing of augmentation data, 2D data, 3D data, virtual object data, user data, transform key data, and/or encryption data, can be implemented on user equipment, on remote servers, or across both.

In client-server-based embodiments, the control circuitry 804 may include communications circuitry suitable for communicating with one or more servers that may at least implement the described interactions with virtual representations of sensitive objects functionality. The instructions for carrying out the above-mentioned functionality may be stored on the one or more servers. Communications circuitry may include a cable modem, an integrated service digital network ("ISDN") modem, a digital subscriber line ("DSL") modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 808 that is part of the control circuitry 804. As referred to herein, the phrase "electronic storage device" or "storage device" should be understood to mean any device for storing electronic data, computer software, or firmware, such as random-access memory, read-only memory, hard drives, optical drives, digital video disc ("DVD") recorders, compact disc ("CD") recorders, BLU-RAY disc ("BD") recorders, BLU-RAY 3D disc recorders, digital video recorders ("DVR", sometimes called a personal video recorder, or "PVR"), solid-state devices, quantum storage devices, gaming consoles, gaming media, or any other suitable fixed or removable storage devices, and/or any combination of the same. The storage 808 may be used to store various types of content described herein. Nonvolatile memory may also be used (e.g., to launch a boot-up routine and other instructions). Cloud-based storage, described in relation to FIG. 7 and FIG. 9, may be used to supplement the storage 808 or instead of the storage 808.

The control circuitry 804 may include audio generating circuitry and tuning circuitry, such as one or more analog tuners, audio generation circuitry, filters or any other suitable tuning or audio circuits or combinations of such circuits. The control circuitry 804 may also include scaler circuitry for upconverting and down converting content into the preferred output format of the user equipment device 800. The control circuitry 804 may also include digital-to-analog converter circuitry and analog-to-digital converter circuitry for converting between digital and analog signals. The tuning and encoding circuitry may be used by the user equipment device 800 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 808 is provided as a separate device from the user equipment device 800, the tuning and encoding circuitry (including multiple tuners) may be associated with the storage 808.

The user may utter instructions to the control circuitry 804, which are received by the microphone 816. The microphone 816 may be any microphone (or microphones) capable of detecting human speech. The microphone 816 is connected to the processing circuitry 806 to transmit detected voice commands and other speech thereto for processing. In some embodiments, voice assistants (e.g., Siri, Alexa, Google Home and similar such voice assistants) receive and process the voice commands and other speech.

The user equipment device 800 may optionally include an interface 810. The interface 810 may be any suitable user interface, such as a remote control, mouse, trackball, keypad, keyboard, touch screen, touchpad, stylus input, joystick, or other user input interfaces. A display 812 may be provided as a stand-alone device or integrated with other elements of the user equipment device 800. For example, the display 812 may be a touchscreen or touch-sensitive display. In such circumstances, the interface 810 may be integrated with or combined with the microphone 816. When the interface 810 is configured with a screen, such a screen may be one or more of a monitor, a television, a liquid crystal display ("LCD") for a mobile device, active matrix display, cathode ray tube display, light-emitting diode display, organic light-emitting diode display, quantum dot display, or any other suitable equipment for displaying visual images. In some embodiments, the interface 810 may be HDTV-capable. In some embodiments, the display 812 may be a 3D display. A speaker 814 may be controlled by the control circuitry 804. The speaker (or speakers) 814 may be provided as integrated with other elements of user equipment device 800 or may be a stand-alone unit. In some embodiments, the display 812 may be outputted through speaker 814.

In an embodiment, the display 812 is a headset display (e.g., when the user equipment device 800 is an XR headset). The display 812 may be an optical see-through (OST) display, wherein the display includes a transparent plane through which objects in a user's physical environment can be viewed by way of light passing through the display 812. The user equipment device 800 may generate for display virtual or augmented objects (e.g., objects such as sensitive or private objects, "stand-in" virtual objects, etc.) to be displayed on the display 812, thereby augmenting the real-world scene visible through the display 812. In an embodiment, the display 812 is a video see-through (VST) display. In some embodiments, the user equipment device 800 may optionally include a sensor 818. Although only one sensor 818 is shown, any number of sensors may be used. In some embodiments, the sensor 818 is a camera, depth sensors, Lidar sensor, and/or any similar such sensor. In some embodiments, the sensor 818 (e.g., image sensor(s) or camera(s)) of the user equipment device 800 may capture the real-world environment around the user equipment device 800. The user equipment device 800 may then render the captured real-world scene on the display 812. The user equipment device 800 may generate for display virtual or augmented objects (e.g., objects such as sensitive or private objects, "stand-in" virtual objects, etc.) to be displayed on the display 812, thereby augmenting the real-world scene visible on the display 812.

The user equipment device 800 of FIG. 8 can be implemented in system 700 of FIG. 7 as user equipment device 702, but any other type of user equipment suitable for providing privacy while allowing interactions with virtual representations of sensitive objects may be used. For example, user equipment devices such as television equipment, computer equipment, wireless user communication devices, or similar such devices may be used. User equipment devices may be part of a network of devices.

FIG. 9 shows an illustrative block diagram of a server system 900, in accordance with some embodiments of the disclosure. Server system 900 may include one or more computer systems (e.g., computing devices), such as a desktop computer, a laptop computer, and a tablet computer. In some embodiments, the server system 900 is a data server that hosts one or more databases (e.g., databases of images or videos), models, or modules or may provide various executable applications or modules. In practice, and as recognized by those of ordinary skill in the art, items shown separately could be combined and some items could be separated. In some embodiments, not all shown items must be included in server system 900. In some embodiments, server system 900 may comprise additional items.

The server system 900 can include processing circuitry 902 that includes one or more processing units (processors or cores), storage 904, one or more network or other communications network interfaces 906, and one or more input/output (I/O) paths 908. I/O paths 908 may use communication buses for interconnecting the described components. I/O paths 908 can include circuitry (sometimes called a chipset) that interconnects and controls communications between system components. Server system 900 may receive content and data via I/O paths 908. The I/O path 908 may provide data to control circuitry 910, which includes processing circuitry 902 and a storage 904. The control circuitry 910 may be used to send and receive commands, requests, and other suitable data using the I/O path 908. The I/O path 908 may connect the control circuitry 910 (and specifically the processing circuitry 902) to one or more communications paths. I/O functions may be provided by one or more of these communications paths but are shown as a single path in FIG. 9 to avoid overcomplicating the drawing.

The control circuitry 910 may be based on any suitable processing circuitry such as the processing circuitry 902. As referred to herein, processing circuitry should be understood to mean circuitry based on one or more microprocessors, microcontrollers, digital signal processors, programmable logic devices, FPGAs, ASICs, etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

Memory may be an electronic storage device provided as the storage 904 that is part of the control circuitry 910. Storage 904 may include random-access memory, read-only memory, high-speed random-access memory (e.g., DRAM, SRAM, DDR RAM, or other random-access solid-state memory devices), non-volatile memory, one or more magnetic disk storage devices, optical disk storage devices, flash memory devices, other non-volatile solid-state storage devices, quantum storage devices, and/or any combination of the same.

In some embodiments, storage 904 or the computer-readable storage medium of the storage 904 stores an operating system, which includes procedures for handling various basic system services and for performing hardware dependent tasks. In some embodiments, storage 904 or the computer-readable storage medium of the storage 904 stores a communications module, which is used for connecting the server system 900 to other computers and devices via the one or more communication network interfaces 906 (wired or wireless), such as the internet, other wide area networks, local area networks, metropolitan area networks, and so on. In some embodiments, storage 904 or the computer-readable storage medium of the storage 904 stores a web browser (or other application capable of displaying web pages), which enables a user to communicate over a network with remote computers or devices. In some embodiments, storage 904 or the computer-readable storage medium of the storage 904 stores a database for augmentation data, 2D mapping data, 3D mapping data, virtual object data, user information, transform key data, encryption data, and/or similar such information.

In some embodiments, executable modules, applications, or sets of procedures may be stored in one or more of the previously mentioned memory devices and corresponds to a set of instructions for performing a function described above. In some embodiments, modules or programs (i.e., sets of instructions) need not be implemented as separate software programs, procedures, or modules, and thus various subsets of modules may be combined or otherwise re-arranged in various implementations. In some embodiments, the storage 904 stores a subset of the modules and data structures identified above. In some embodiments, the storage 904 may store additional modules or data structures not described above.

Figure 10:
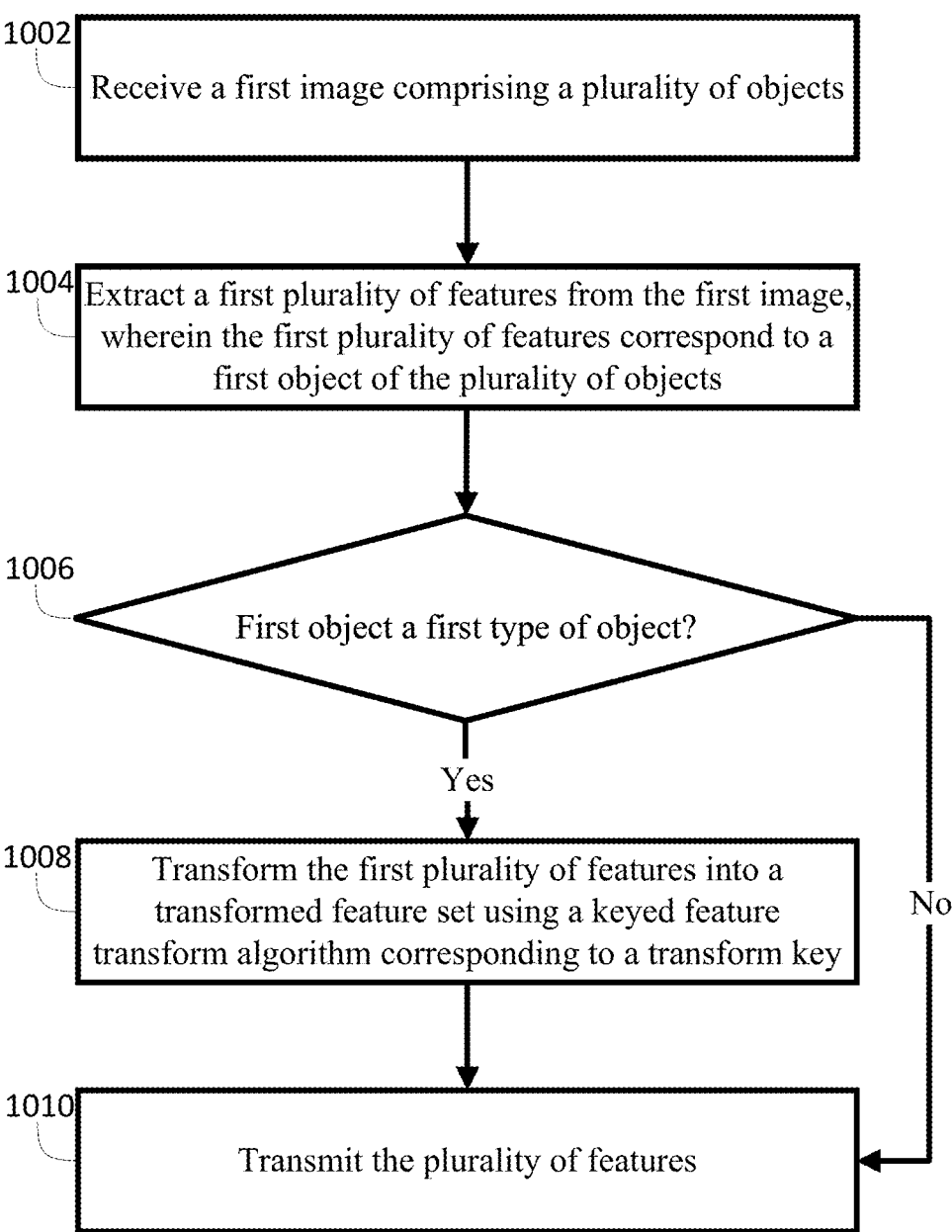
FIG. 10 is an illustrative flowchart of a process for providing privacy while allowing interactions with virtual representations of the sensitive objects, in accordance with some embodiments of the disclosure.

FIG. 10 is an illustrative flowchart of a process 1000 for providing privacy while allowing interactions with virtual representations of sensitive objects, in accordance with some embodiments of the disclosure. Process 1000, and any of the following processes, may be executed by control circuitry 804 on a user equipment device 800 and/or control circuitry 910 on a server 900. In some embodiments, control circuitry may be part of a remote server separated from the user equipment device 800 by way of a communications network or distributed over a combination of both. In some embodiments, instructions for executing process 1000 may be encoded onto a non-transitory storage medium (e.g., the storage 808, the storage 904) as a set of instructions to be decoded and executed by processing circuitry (e.g., the processing circuitry 806, the processing circuitry 902). Processing circuitry may, in turn, provide instructions to other sub-circuits contained within control circuitry, such as the encoding, decoding, encrypting, decrypting, scaling, analog/digital conversion circuitry, and the like. It should be noted that any of the processes, or any step thereof, could be performed on, or provided by, any of the devices described in FIGS. 1-9. Although the processes are illustrated and described as a sequence of steps, it is contemplated that various embodiments of the processes may be performed in any order or combination and need not include all the illustrated steps.

At 1002, control circuitry receives a first image comprising a plurality of objects. In some embodiments, the control circuitry receives the first image from one or more sensors (e.g., camera, depth sensors, Lidar sensor, etc.). For example, an XR device may comprise the one or more sensors and the control circuitry, and the control circuitry may receive the first image from the one or more sensors. In some embodiments, the control circuitry requests the first image from the one or more sensors. For example, the control circuitry may request an image of the environment (e.g., environment 110) around the control circuitry and/or a portion of the environment around the control circuitry. In some embodiments, the first image is one of a plurality of images captured by the one or more sensors. In some embodiments, the first image is generated from information from a plurality of sensors.

At 1004, control circuitry extracts a first plurality of features from the first image, wherein the first plurality of features correspond to a first object of the plurality of objects. In some embodiments, the control circuitry extracts a plurality of features from the first image to identify one or more objects in the first image. For example, the control circuitry may use one or more techniques (e.g., feature matching) to determine that a first set of features of the plurality of features relates to a first object. The control circuitry may also use the one or more techniques to determine that a second set of features of the plurality of features relates to a second object.

At 1006, control circuitry determines whether the first object is a first type of object. In some embodiments, the control circuitry uses the first plurality of features extracted at step 1004 to determine a type associated with the first object. For example, the control circuitry may use a classification algorithm to classify the first object as a first type. The control circuitry may also use the classification algorithm to classify the second object as a second type. In some embodiments, an object type corresponds to any attribute related to the object. For example, the object type may relate to the sensitivity of the object, maturity ranking of the object, functionality of the object, and/or similar such attributes. In some embodiments, the first type corresponds to private objects while the second type corresponds to non-private objects. In some embodiments, the control circuitry uses a profile associated with a user when determining object types. The profile may comprise one or more preferences (e.g., family photos correspond to private objects, banking information corresponds to private objects, furniture corresponds to public objects, etc.). In some embodiments, the control circuitry uses the one or more preferences when determining the object type for the first object. If the control circuitry determines that the first object is the first type of object, then the process 1000 continues to step 1008. If the control circuitry determines that the first object is not the first type of object, then the process 1000 continues to step 1010.

At 1008, control circuitry transforms the first plurality of features into a transformed feature set using a keyed feature transform algorithm corresponding to a transform key. In some embodiments, the control circuitry has access to one or more transform keys, wherein each transform key is associated with one or more keyed feature transform algorithms. For example, a key may be associated with a keyed feature transform algorithm that convolves a feature set with a random convolution kernel. In another example, a key may be associated with a keyed feature transform algorithm that multiplies a feature set with a random key in a frequency plane after applying a DFT to the first set of features. In some embodiments, one or more transform keys are stored in a database comprising a plurality of transform keys where each transform key of the plurality of transform keys correspond to one or more object types. For example, a first transform key may correspond to private objects while a second transform key may correspond to age-restricted objects. In such an example, if the control circuitry identifies an object as private, then the control circuitry may access the database to identify the first transform key. The control circuitry may then transform the plurality of features corresponding to the private object into a transformed feature set using the keyed feature transform algorithm associated with the first transform key.

At 1010, control circuitry transmits the plurality of features. In some embodiments, the plurality of features comprises one or more transformed feature sets and/or one or more non-transformed featured sets. For example, the control circuitry may transform a first set of features relating to a first object into a first transformed features set at step 1008 because the first object is classified as a private object. The control circuitry may not transform a second set of features relating to the second object because the second object is classified as a public object. In some embodiments, the control circuitry transmits the plurality of features to a device. For example, the control circuitry may transmit the plurality of features to a server providing XR services. In another example, the control circuitry may transmit the plurality of features to an XR device so the XR device can display one or more virtual objects corresponding to the plurality of features. In some embodiments, the control circuitry encrypts portions of the plurality of features before transmitting the plurality of features.

FIG. 11 is another illustrative flowchart of a process 1100 for providing privacy while allowing interactions with virtual representations of sensitive objects, in accordance with some embodiments of the disclosure. Like process 1000, process 1100 may be executed by control circuitry 804 on a user equipment device 800 and/or control circuitry 910 on one or more servers (e.g., server 900). In some embodiments, the user equipment device 800 and/or the server 900 may be configured in a manner similar to that described regarding the process 1000 to implement the process 1100.

At 1102, control circuitry receives a first image comprising a plurality of objects. In some embodiments, the control circuitry uses the same or similar methods described in step 1002 above.

At 1104, control circuitry extracts a first plurality of features corresponding to a first object from the first image. In some embodiments, the control circuitry extracts a plurality of features from the first image to identify one or more objects in the first image. In some embodiments, the control circuitry uses one or more techniques (e.g., feature matching) to determine that a first set of features of the plurality of features relates to a first object.

At 1106, control circuitry extracts a second plurality of features corresponding to a second object from the first image. In some embodiments, the control circuitry uses the same or similar one or more techniques described in step 1104 to determine that a second set of features of the plurality of features relates to a second object.

At 1108, control circuitry generates a first virtual object and a second virtual object in an XR environment. In some embodiments, the XR environment is generated on a display (e.g., display 812) of a device (e.g., XR device 102) for a user (e.g., user 104). In some embodiments, the control circuitry receives data related to a real-world environment to generate the XR environment from one or more sensors (e.g., camera, depth sensors, Lidar sensor, etc.). For example, the control circuitry may use an image sensor to capture images (e.g., first image of step 1102). In some embodiments, the control circuitry uses the first plurality of features corresponding to the first object to generate the first virtual object in the XR environment and uses the second plurality of features corresponding to the second object to generate the second virtual object in the XR environment At 1110, control circuitry determines whether the first object corresponds to a first type of object. In some embodiments, the control circuitry uses the first plurality of features extracted at step 1104 to determine a type associated with one or more of the identified objects. For example, the control circuitry may use a classification algorithm to classify the first object as a first type (e.g., private). In some embodiments, an object type corresponds to any attribute related to the object. For example, the object type may relate to the sensitivity of the object, maturity ranking of the object, functionality of the object, and/or similar such attributes. If the control circuitry determines that the first object corresponds to the first type of object, then the process 1100 continues to step 1112. If the control circuitry determines that the first object does not correspond to the first type of object, then the process 1100 continues to step 1114.

At step 1110, or in an additional step, the control circuitry may determine whether any other objects identified from the first image correspond to the first type of object. For example, the control circuitry may use the same or similar methods as described above to classify the second object as a second type (e.g., public). The control circuitry may determine that the second type of object is different than the first type of object and not transform the second plurality of features into a transformed feature set at step 1112. In another example, control circuitry may use the same or similar methods as described above to determine that the second object is not the first type of object (e.g., not private). The control circuitry may determine that the second object is not the first type of object and not transform the second plurality of features into a transformed feature set at step 1112.

At 1112, control circuitry transforms the plurality of features related to the object of the first type into a transformed feature set. For example, the control circuitry may use a first transform key to transform the first plurality of features related to the first object of the first type into a transformed feature set. In some embodiments, the control circuitry has access to a database comprising a plurality of transform keys and each transform key of the plurality of transform keys correspond to one or more object types. For example, a first transform key may correspond to a first object type. The control circuitry may use the first transform key to transform the first plurality of features related to the first object because the first object was determined to be the first type of object at step 1110. In some embodiments, the control circuitry uses one or more transforms keys to transform a plurality of features relating to all objects corresponding to the first type of object. For example, if the control circuitry determines that five objects of the plurality of objects correspond to the first type of object, then the control circuitry transforms each plurality of features relating to each object corresponding to the first type of object using the first transform key.

At 1114, control circuitry transmits the transformed feature set and the second plurality of features. For example, the control circuitry may transmit the transformed feature set relating to the first object of step 1112 with the second plurality of features relating to the second object to a device. In some embodiments, the second plurality of features are not transformed before transmitting because the second object is not the first type of object. In some embodiments, the control circuitry transmits the transformed feature set and the second plurality of features to a server providing XR services and/or to an XR device. In some embodiments, the control circuitry encrypts portions of the transformed feature set and/or the second plurality of features before transmitting the transformed feature set and the second plurality of features.

At 1116, control circuitry receives a first action relating to the transformed feature set and a second action corresponding to the second plurality of features. In some embodiments, the control circuitry receives the first action and the second action from the device that received the transformed feature set and the second plurality of features at step 1114. In some embodiments, the received actions correspond to the virtual objects generated at step 1108. For example, the first action relating to the transformed feature set may correspond to changing the position of the first virtual object in the XR environment and the second action relating to the second plurality of features may correspond to changing the orientation of the second virtual object in the XR environment At 1118, control circuitry generates for display the first action on the first virtual object and the second action on the second virtual object. For example, the control circuitry may display the first virtual object changing from a first position to a second position in the XR environment. The control circuitry may also display the second virtual object changing from a first orientation to a second orientation in the XR environment. In some embodiments, the control circuitry displays one or more actions by back transforming sets of features that were previously transformed by the control circuitry. For example, the control circuitry transformed the first plurality of features corresponding to the first object into a transformed feature set at step 1112. The control circuitry may back transform the transformed feature set and display any actions (e.g., change of position) associated with the transformed feature set in the XR environment. In some embodiments, the control circuitry displays one or more actions without back transforming the received data. For example, the control circuitry did not transform the second plurality of features corresponding to the second virtual object because the second object was not classified as the first object type in step 1110. The control circuitry may display any actions (e.g., change of orientation) associated with the second plurality of features in the XR environment without back transforming the second plurality of features.

FIG. 12 is an illustrative flowchart of a process 1200 for providing privacy while allowing interactions with virtual representations of sensitive objects, in accordance with some embodiments of the disclosure. Like process 1000, process 1200 may be executed by control circuitry 804 on a user equipment device 800 and/or control circuitry 910 on one or more servers (e.g., server 900). In some embodiments, the user equipment device 800 and/or the server 900 may be configured in a manner similar to that described regarding the process 1000 to implement the process 1200.

At 1202, control circuitry receives a plurality of features corresponding to one or more virtual objects. In some embodiments, the control circuitry receives the plurality of features from one or more XR devices (e.g., XR device 102). In some embodiments, the control circuitry receives one or more packets (e.g., first packet 402) comprising the plurality of features. In some embodiments, the one or more virtual objects correspond to real objects. For example, a virtual object may correspond to a virtual representation of a real-world object (e.g., first object 106) generated by an XR device.

At 1204, control circuitry determines that a first set of features corresponds to a first virtual object. In some embodiments, the plurality of features received at step 1202 comprises the first set of features. In some embodiments, the first set of features correspond to a transformed feature set. For example, the one or more devices that transmitted the plurality of features corresponding to one or more virtual objects may have transformed some or all of the plurality of features. The control circuitry may use one or more techniques (e.g., feature matching) to determine that the first set of features of the plurality of features relates to the first virtual object. In some embodiments, the control circuitry determines that the first set of features corresponds to the first virtual object using a received object ID (e.g., object ID 404) associated with the first set of features. In some embodiments, the control circuitry determines that the first set of features corresponds to the first virtual object using received metadata (e.g., metadata 414) associated with the first set of features.

At 1206, control circuitry determines whether the first virtual object corresponds to one or more avatars of a plurality of avatars. In some embodiments, the control circuitry has access to a database with a plurality of entries linking a plurality of previously stored objects to a plurality of avatars. The previously stored objects may correspond to virtual objects (e.g., first virtual object. In some embodiments, the control circuitry stores an object in the database whenever the device receives a set of features that do not match a previously stored object and cannot be mapped to a previously stored object. In some embodiments, one or more attributes of the plurality of previously stored objects correspond to the plurality of avatars. For example, a first entry may associate a first previously stored object (e.g., picture) with a first avatar (e.g., rectangular prism). The first previously stored object and first avatar may share height, length, width, color, texture and/or similar such attributes. The first previously stored object and first avatar may also share position, orientation, and/or similar such attributes relative to an XR environment.

In some embodiments, the control circuitry compares the first virtual object to the plurality of entries to determine if the first virtual object corresponds to one or more previously stored objects. For example, the control circuitry may compare the first set of features to sets of features corresponding to the previously stored objects. If the control circuitry determines that the first virtual object corresponds to one of the entries of the plurality of entries, then the control circuitry identifies the avatar associated with the corresponding entry. If the control circuitry determines that the first virtual object corresponds to one or more avatars of the plurality of avatars, then the process 1200 continues to step 1208. If the control circuitry determines that the first virtual object does not correspond to one or more avatars of the plurality of avatars, then the process 1200 continues to step 1210.

At 1208, control circuitry updates a characteristic of an avatar based on the first set of features. In some embodiments, the avatar is the one or more avatars identified in step 1206. In some embodiments, the control circuitry calculates differences between the first set of features and the previously stored object corresponding to the avatar. For example, the first set of features relating to the first virtual object may correspond to a first previously stored object, but the first virtual object may have different position coordinates than the first previously stored object corresponding to the avatar. In such an example, the control circuitry can update the database corresponding to the first previously stored object to indicate the updated position coordinates of the first virtual object. In some embodiments, the control circuitry updates a characteristic of the avatar to reflect the differences between the first set of features and the previously stored object corresponding to the avatar. For example, the control circuitry may update the position of the avatar to reflect the updated position of the first virtual object.

At 1210, control circuitry determines whether the first virtual object can be mapped to one or more avatars of the plurality avatars. In some embodiments, the first virtual object may correspond to a portion of an avatar. For example, the first virtual object may correspond to an arm of a virtual representation of a person and a first avatar may correspond to the virtual representation of the person. In another example, the first virtual object may correspond to a single blade on a virtual representation of a ceiling fan and the first avatar may correspond to the virtual representation of the ceiling fan. In some embodiments, the control circuitry determines whether the first virtual object can be mapped to the first avatar using the plurality of features associated with the first virtual object. For example, if the position coordinates of the plurality of features are within a threshold distance of the position coordinates of the first avatar, then the control circuitry may determine that the first virtual object can be mapped to the first avatar.

In some embodiments, the control circuitry only considers incomplete avatars of the plurality of avatars when determining whether the first virtual object can be mapped to one or more avatars of the plurality avatars. For example, the control circuitry may use one or more techniques (e.g., feature matching) to determine that a subset of the plurality of avatars are incomplete. In such an example, the control circuitry may determine that the first virtual object (e.g., arm of the virtual representation of the person) can be mapped to a first avatar (e.g., a virtual representation of a person without an arm) of the incomplete avatars. If the control circuitry determines that the first virtual object can be mapped to one or more avatars of the plurality avatars, then the process 1200 continues to step 1212. If the control circuitry determines that the first virtual object cannot be mapped to one or more avatars of the plurality avatars, then the process 1200 continues to step 1214.

At 1212, control circuitry updates a characteristic of a second avatar based on the first set of features. In some embodiments, the second avatar is the one or more avatars identified in step 1210. In some embodiments, the control circuitry updates the characteristic of the second avatar by adding the first virtual object to the second avatar. For example, the control circuitry may update the set of features related to a previously stored object(s) corresponding to the second avatar (e.g., a virtual representation of a person without an arm) to include the first set of features corresponding to the first virtual object (e.g., arm of the virtual representation of the person). In such an example, the control circuitry may also store metadata indicating that the first set of features relates to the previously stored object(s) corresponding to the second avatar and/or to the second avatar.

At 1214, control circuitry generates a third avatar based on the first set of features. In some embodiments, the control circuitry also creates a new entry in the database of the plurality of entries. The new entry may link the first virtual object and/or the first set of features corresponding to the first virtual object to the third avatar.

At 1216, control circuitry transmits the avatar information. In some embodiments, the avatar information comprises information about one or more avatars, information regarding generating one or more avatars, information related to a virtual environment comprising one or more avatars, and/or similar such information. For example, the avatar information may comprise the one or more characteristic updates to the first avatar described in step 1208, the one or more characteristic updates to the second avatar described in step 1212, and/or information related to the generation of the third avatar described in step 1214. In some embodiments, the control circuitry transmits the avatar information to one or more XR devices. In some embodiments, the control circuitry transmits the avatar information to a different device than the device that transmitted the plurality of features at step 1202.

At 1218, control circuitry receives updated avatar information. In some embodiments, the control circuitry receives the updated avatar information from the same device that the control circuitry transmitted the avatar information to at step 1216. In some embodiments, the updated avatar information corresponds to one or more actions relating to one or more avatars. For example, a first action may correspond to the first avatar changing from a first position to a second position and a second action may correspond to a second avatar changing from a first orientation to a second orientation.

At 1220, control circuitry transmits the updated avatar information. In some embodiments, the control circuitry transmits the updated avatar information to the same device that transmitted the plurality of features at step 1202. In some embodiments, the control circuitry transmits one or more packets (e.g., second packet 416) comprising the updated avatar information to the device that transmitted the plurality of features at step 1202. In some embodiments, the control circuitry also transmits additional information along with the updated avatar information. For example, the control circuitry may transmit an object ID (e.g., object ID 404) along with information associated with a first action indicating that the first action relates to the virtual object corresponding to the object ID. In another example, the control circuitry may transmit metadata (e.g., metadata 414) along with information associated with a second action indicating that the second action relates to the virtual object corresponding to the metadata.

It is contemplated that some suitable steps or suitable descriptions of FIGS. 10-12 may be used with other suitable embodiments of this disclosure. In addition, some suitable steps and descriptions described in relation to FIGS. 10-12 may be implemented in alternative orders or in parallel to further the purposes of this disclosure. For example, some suitable steps may be performed in any order or in parallel or substantially simultaneously to reduce lag or increase the speed of the system or method. Some suitable steps may also be skipped or omitted from the process. Furthermore, it should be noted that some suitable devices or equipment discussed in relation to FIGS. 1-9 could be used to perform one or more of the steps in FIGS. 10-12.

Figure 13:
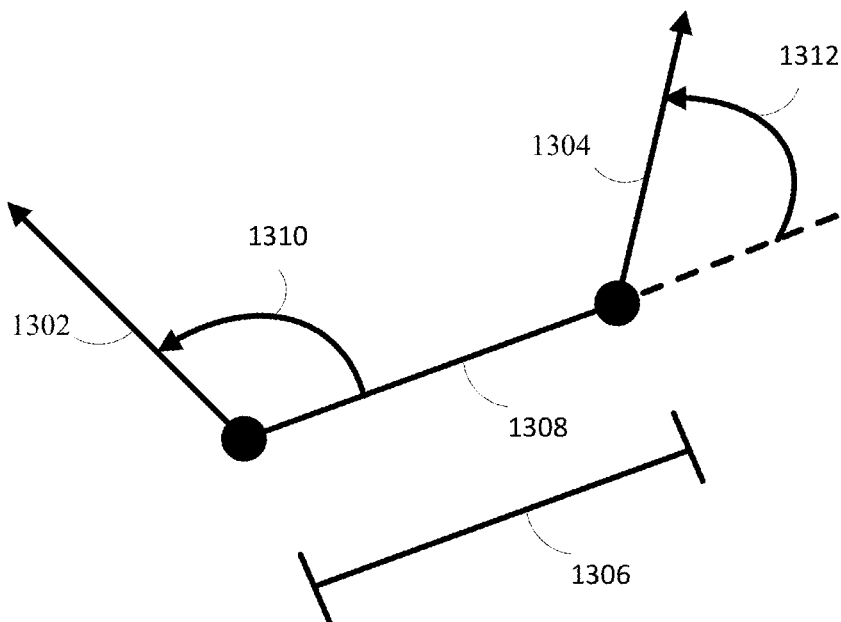
FIG. 13 shows an illustrative diagram of a pair-polar representation, in accordance with some embodiments of the disclosure.

FIG. 13 shows an illustrative diagram of a pair-polar representation 1300, in accordance with some embodiments of the disclosure. In some embodiments, we assume that the extracted features for a first virtual object described in process 600 is represented by a set of features:

$$F_i = (f_{io}, f_{i1}, \dots, f_{ik-1}) \qquad (13)$$

$f_{io}, f_{i1}, \dots, f_{ik-1}$: First feature, second feature, etc. In some embodiments, each feature can be represented by a 64-bit long bit vector. We can assume that location information between features are pair-polar values. In some embodiments, for each pair of features index value for the pair is set to:

$$I = (j, z), j > z, 0 \le j \le k-2, 0 \le z \le k-1 \qquad (14)$$

In some embodiments, the pair of features corresponds to a first feature 1302 and a second feature 1304. The location information for the pair of features (e.g., first feature 1302 and second feature 1304) may be represented by a distance 1306 between the first feature 1302 and the second feature 1304, a first angle 1310 between the direction of the first feature 1302 and a line 1308 between the first feature 1302 and the second feature 1304, and a second angle 1312 between the second feature 1304 and the line 1308 between the first feature 1302 and the second feature 1304. In some embodiments, the distance 1306, first angle 1310, and second angle 1312 are mapped to an integer value.

In some embodiments, a device (e.g., second server 604) receives a message (e.g., message transmitted at step 628) corresponding to a first virtual object. The message may comprise a mathematical relationship and an updated portion of a first transformed feature set. In some embodiments, the device attempts to match the updated portion of the first transformed feature set to a previously stored feature set. In some embodiments, the device determines that the updated portion of the first transformed feature set matches a first previously stored feature set by (i) matching the Hamming distance of the first previously stored feature set with the Hamming distance of the updated portion of the first transformed feature set and (ii) matching the integer value of the first previously stored feature set and the integer value of the updated portion of the first transformed feature set. In some embodiments, once the previously stored feature set is identified the device can update the previously stored feature set using the following equations:

$$(pt_{io}, pt_{i1}, \dots, pt_{ik-1}) = \qquad (15)$$

$$Tr1(k_c, F_i) = (PE(k_c, f_{i0}), PE(k_c, f_{i1}), \dots, PE(k_c, f_{ik-1})) = PT_i$$

$$(pv_{io}, pv_{i1}, \dots, pv_{is-1}) = Tr2(KI_c, F_i) = \qquad (16)$$

$$(b_0 + ki_{cI0}\mathrm{mod}2^w, b_1 + ki_{cI1}\mathrm{mod}2^w, \dots, b_{s-1} + ki_{Cis-1}\mathrm{mod}2^w)$$

pt: A first portion of features.
pv: A second portion of features.
Tr1: A first suitable feature transform.
Tr2: A second suitable feature transform.
$k_c$: a generic feature transform key used to transform objects belonging to class c.
$KI_c$: Index master secret for objects belonging to class c.
c: The object class (e.g., type).
$F_i$: Plurality of features for a first object.
$PE(k_c, x)$: A permutation of x defined by $k_c$.
b: Integer value to which the distance, angle, and second angle are mapped.
w: size of the transform key in bits.

The processes discussed above are intended to be illustrative and not limiting. One skilled in the art would appreciate that the steps of the processes discussed herein may be omitted, modified, combined, and/or rearranged, and any additional steps may be performed without departing from the scope of the invention. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method comprising:

receiving a first image comprising a plurality of objects;

extracting a first plurality of features from the first image, wherein the first plurality of features are associated with a first object of the plurality of objects;

determining that the first plurality of features are to be transformed;

in response to determining that the first plurality of features are to be transformed, transmitting a request for one or more transform keys;

receiving a first transform key corresponding to a first feature transform algorithm and a second transform key corresponding to a second feature transform algorithm;

transforming the first plurality of features into a first transformed feature set using the first feature transform algorithm;

transforming the first plurality of features into a second transformed feature set using the second feature transform algorithm, wherein the second transformed feature set is different than the first transformed feature set; and transmitting, by a first device, the first transformed feature set and the second transformed feature set to a second device, wherein:

the transmitting causes the second device to update a first entry of a plurality of entries to include the first transformed feature set and the second transformed feature set;

the first entry is associated with a first avatar; and the transmitting causes the second device to display an updated extended reality (XR) environment comprising the first avatar, wherein a characteristic of the first avatar is changed within the updated XR environment based, at least in part, on the first transformed feature set.

2. The method of claim 1, wherein determining that the first plurality of features are to be transformed comprises:

determining that the first plurality of features correspond to the first object of the plurality of objects; and determining that the first object is a first type of object, wherein the first type of object corresponds to a private object.

3. The method of claim 2, wherein the request indicates the first type of object.

4. The method of claim 1, further comprising:

extracting a second plurality of features related to a second object of the plurality of objects from the first image;

determining that the second object is a second type of object; and transmitting the first transformed feature set, the second transformed feature set, and the second plurality of features to the second device.

5. The method of claim 1, further comprising, receiving, by the first device, a notification indicating that first transform key can be deleted.

6. The method of claim 1, wherein prior to receiving the first transformed feature set and the second transformed feature set, the plurality of entries only comprised transformed features sets generated using the first transform key.

7. The method of claim 1, wherein:

each entry of the plurality of entries is associated with one or more avatars of a plurality of avatars;

the first entry is associated with the first avatar; and the second transformed feature set is used to update the first avatar.

8. The method of claim 1, wherein the second device is a head-mounted device comprising a display and the updated XR environment is displayed on the display of the second device.

9. A method comprising:

transmitting, by a first device, a first transformed feature set to a second device, wherein:

the first transformed feature set is generated using a first feature transform algorithm;

the transmitting causes the second device to update a first entry of a plurality of entries to include the first transformed feature set;

the first entry is associated with a first avatar; and the transmitting causes the second device to display an extended reality (XR) environment comprising the first avatar, wherein the first avatar is displayed within the XR environment according to the first transformed feature set;

receiving a first image comprising a plurality of objects;

extracting a first plurality of features from the first image, wherein the first plurality of features are associated with a first object of the plurality of objects;

determining that the first plurality of features are to be transformed;

in response to determining that the first plurality of features are to be transformed, transmitting a request for one or more transform keys;

receiving a first transform key corresponding to the first feature transform algorithm and a second transform key corresponding to a second feature transform algorithm;

transforming the first plurality of features into a second transformed feature set using the first feature transform algorithm;

transforming the first plurality of features into a third transformed feature set using the second feature transform algorithm, wherein the second transformed feature set is different than the third transformed feature set; and transmitting, by the first device, the second transformed feature set and the third transformed feature set to the second device, wherein:

the transmitting causes the second device to determine that the second transformed feature set and the third transformed feature set correspond to the first entry based, at least in part, on the first transformed feature set and the second transformed feature set;

the transmitting causes the second device to update the first entry of the plurality of entries to include the second transformed feature set and the third transformed feature set; and the transmitting causes the second device to display an updated XR environment comprising the first avatar, wherein a characteristic of the first avatar is changed within the updated XR environment based, at least in part, on the second transformed feature set.

10. The method of claim 9, wherein the second device determines that the second transformed feature set and the third transformed feature set correspond to the first entry based, at least in part, on a portion of the first transformed feature set being the same as a portion of the second transformed feature set.

11. The method of claim 10, wherein:

each entry of the plurality of entries is associated with one or more avatars of a plurality of avatars.

12. The method of claim 9, wherein the second device is a head-mounted device comprising a display and the updated XR environment is displayed on the display of the second device.

13. The method of claim 12, wherein the second device determines that the second transformed feature set and the third transformed feature set correspond to the first entry based, at least in part, on a portion of the first transformed feature set being within a difference threshold as a portion of the second transformed feature set.

14. A method comprising:

receiving, by a first device, a first transformed feature set, wherein the first transformed feature set is generated using a first feature transform algorithm;

generating, by the first device, a virtual environment for display, wherein:

the virtual environment comprises a first avatar;

the first avatar corresponds to a first object; and the first avatar is generated within the virtual environment using the first transformed feature set;

accessing, by the first device, a database comprising a plurality of entries, wherein each entry links at least one avatar to at least one feature set;

generating, by the first device, a first entry associated with the first avatar, wherein the first entry comprises the first transformed feature set;

displaying, by the first device, the virtual environment comprising the first avatar;

receiving a first image comprising a plurality of objects, wherein the plurality of objects comprise the first object;

extracting a first plurality of features from the first image, wherein the first plurality of features are associated with the first object;

determining that the first plurality of features are to be transformed;

in response to determining that the first plurality of features are to be transformed, transmitting a request for one or more transform keys;

receiving a first transform key corresponding to the first feature transform algorithm;

receiving a second transform key corresponding to a second feature transform algorithm;

transforming, by a second device, the first plurality of features into a second transformed feature set using the second feature transform algorithm;

transforming, by the second device, the first plurality of features into a third transformed feature set using the first feature transform algorithm, wherein the second transformed feature set is different than the third transformed feature set;

transmitting, by the second device, the second transformed feature set and the third transformed feature set to the first device;

determining, by the first device, that the second transformed feature set corresponds to the first entry based, at least in part, on the first transformed feature set and the second transformed feature set;

updating, by the first device, the first entry to comprises the second transformed feature set and the third transformed feature set;

generating, by the first device, an updated virtual environment, wherein the first avatar is updated within the updated virtual environment using the second transformed feature set; and displaying, by the first device, the updated virtual environment.

15. The method of claim 14, wherein the first entry is associated with the first object.

16. The method of claim 15, wherein prior to receiving the second transformed feature set and the third transformed feature set, the plurality of entries only comprised transformed features sets generated using the first transform key.

17. The method of claim 14, wherein the first device is a head-mounted device comprising a display and the updated XR environment is displayed on the display of the first device.

18. The method of claim 17, wherein determining that the second transformed feature set corresponds to the first entry comprises determining a portion of the first transformed feature set is the same as a portion of the second transformed feature set.

19. The method of claim 17, wherein determining that the second transformed feature set corresponds to the first entry comprises determining a portion of the first transformed feature set is within a difference threshold of a portion of the second transformed feature set.

* * * * *